United States Patent
Onishi

(10) Patent No.: US 9,412,415 B2
(45) Date of Patent: *Aug. 9, 2016

(54) CONTENT SYNCHRONIZATION SYSTEM, CONTENT-SYNCHRONIZATION CONTROL DEVICE, AND CONTENT PLAYBACK DEVICE

(75) Inventor: Takeo Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/346,779

(22) PCT Filed: Sep. 12, 2012

(86) PCT No.: PCT/JP2012/005799
§ 371 (c)(1),
(2), (4) Date: Mar. 24, 2014

(87) PCT Pub. No.: WO2013/046573
PCT Pub. Date: Apr. 4, 2013

(65) Prior Publication Data
US 2014/0226949 A1 Aug. 14, 2014

(30) Foreign Application Priority Data
Sep. 26, 2011 (JP) .................................. 2011-208494

(51) Int. Cl.
| G11B 27/10 | (2006.01) |
| H04N 21/61 | (2011.01) |
| H04N 21/6587 | (2011.01) |
| H04N 21/8547 | (2011.01) |

(52) U.S. Cl.
CPC ............ G11B 27/10 (2013.01); H04N 21/6125 (2013.01); H04N 21/6587 (2013.01); H04N 21/8547 (2013.01)

(58) Field of Classification Search
None
See application file for complete search history.

(56) References Cited

U.S. PATENT DOCUMENTS

| 2009/0234993 A1* | 9/2009 | Kitamura | .............. G06F 13/385 710/72 |
| 2010/0318860 A1* | 12/2010 | Ohbi | ..................... H04N 5/765 714/700 |
| 2014/0237523 A1* | 8/2014 | Onishi | .......................... 725/88 |

FOREIGN PATENT DOCUMENTS

| JP | 2009-268141 A | 11/2009 |
| JP | 2010-206349 A | 9/2010 |
| JP | 2011-501260 A | 1/2011 |
| JP | 2011-035503 A | 2/2011 |

OTHER PUBLICATIONS

International Search Report corresponding to PCT/JP2012/005799, dated Dec. 18, 2012; 3 pages.
Carbou, Mathieu, "Reverse Ajax: Dai 1 Kai Comet no Shokai", [Online], Aug. 26, 2011, Internet <URL: http://www.ibm.com/developerworks/jp/web/library/wa-reverseajax1/>, [retrieval date Dec. 7, 2012, 8 pages.

* cited by examiner

Primary Examiner — Eileen Adams
(74) Attorney, Agent, or Firm — Wilmer Cutler Pickering Hale and Dorr LLP

(57) ABSTRACT

When long polling is employed under HTTP, a content-synchronization control device can control each content playback device so that content control is synchronized in multiple content playback devices. When receiving an inquiry from a content playback device 90, the response control means 84 waits transmission of an inquiry response in reply to the inquiry for a certain period of time since reception of the inquiry, and when the waiting state of the transmission of an inquiry response is cancelled, the waiting state of transmission of all the inquiry responses are cancelled. After the reception of the request information, the response control means 84 cancels the waiting state of the transmission of each inquiry response when a condition that the transmission of each inquiry response to each content playback device is kept waiting is satisfied.

11 Claims, 15 Drawing Sheets

FIG. 3

| CLIENT TERMINAL IDENTIFIER | COMMUNICATION DELAY (ms) | PREVIOUS INQUIRY RESPONSE TRANSMISSION TIME (ms) |
|---|---|---|
| 20a | 10 | 1308637151322 |
| 20b | 200 | 1308637151332 |

FIG. 4

[EXAMPLE 1]
command=pause

[EXAMPLE 2]
command=seek
position=2300

[EXAMPLE 3]
command=forward
speed=4

FIG. 5

[EXAMPLE 1]
command=pause
time=1308637152032

[EXAMPLE 2]
command=seek
position=2300
time=1308637165983

[EXAMPLE 3]
command=forward
speed=4
time=1308637178111

FIG. 6

| PLAYBACK CONTROL COMMAND, OR PLAYBACK CONTROL INFORMATION |
|---|
| command=pause |

FIG. 12

| PLAYBACK CONTROL COMMAND, OR PLAYBACK CONTROL INFORMATION |
|---|
| command=pause<br>time=1308637152032 |

CONTENT SYNCHRONIZATION SYSTEM, CONTENT-SYNCHRONIZATION CONTROL DEVICE, AND CONTENT PLAYBACK DEVICE

CROSS-REFERENCE TO RELATED APPLICATIONS

This application is a national stage application of International Application No. PCT/JP2012/005799 entitled "CONTENT SYNCHRONIZATION SYSTEM, CONTENT-SYNCHRONIZATION CONTROL DEVICE, AND CONTENT PLAYBACK DEVICE", filed on Sep. 12, 2012, which claims the benefit of the priority of Japanese Patent Application No. 2011-208494, filed on Sep. 26, 2011, the disclosures of each of which are hereby incorporated by reference in their entirety.

TECHNICAL FIELD

The present invention relates to a content synchronization system for synchronizing content control in multiple content playback devices, and also relates to a content-synchronization control device, a content playback device, a content synchronization method, a content-synchronization control method, a content playback method, a content-synchronization control program, and a content playback program which are applied to the content synchronization system.

BACKGROUND ART

Various techniques for reproducing the same content by synchronizing the content in multiple information processing devices have been suggested (for example, see PLT 1 to 3).

For example, in the technique described in PLT 1, a master terminal calculates an encoded video decoding start time. At this occasion, the master terminal calculates, as a decoding start time, a time obtained by adding the maximum time from when a decoding start command is transmitted from the master terminal to when it reaches the slave terminal to the time of the wave radio clock. The master terminal transmits the decoding start time to all the slave terminals. Then, when the time indicated by the radio wave clock becomes the decoding start time, all the slave terminals start decoding encoded video.

For example, according to the technique described in PLT 2, one parent station transmits content ID, control type information, control start information, control start command to multiple terminal stations. Then, the terminal station starts control of the content designated by the content ID at a time designated by the control start information. At this occasion, the terminal station controls the content in accordance with the control content designated by the control type information. Examples of control type information include "reproducing content data", "fast-forward content data", and the like.

For example, PLT 3 indicates that the user computer reproducing the content commands another user computer to change flow of video data by enabling at least one of the functions of "stop", "pause", "fast-reverse", and "fast-forward" of the video data. PTL 3 describes, at this occasion, a mode in which the user computer transmits a command to another user computer in a form of peer-to-peer and a mode in which a command is transmitted via a content providing device such as a server.

PLT 3 describes HTTP (hypertext transfer protocol) as a standard of data transmission in a computer network.

CITATION LIST

Patent Literature

PLT 1: JP 2011-35503 A (paragraphs 0012, 0013, 0032)
PLT 2: JP 2009-268141 A (paragraphs 0051, 0034, 0038 to 0050)
PLT 3: Japanese Translation of PCT application No. 2011-501260 (paragraphs 0030, 0039, 0040, FIG. 1, paragraph 0032)

SUMMARY OF INVENTION

Technical Problem

In the technique described in PLT 1, the maximum time from when the decoding start command is transmitted from the master terminal to when it is received by the slave terminal is added to the time of the radio wave clock, whereby the decoding start times of all the slave terminals can be calculated. As a result, playback of the video on all the slave terminals can be started at a time.

However, when a server/client system including an HTTP server and an HTTP client is applied to the technique described in PLT 1, there is a problem in that the server cannot appropriately determine a time when each client executes various commands (for example, playback, stop, and the like) concerning content playback at a time (playback control time). Hereinafter, this feature will be explained more specifically.

In order to synchronize the content playback by each client in response to operation with any one of the clients in the HTTP server/client system, it is necessary for each client to perform polling with the server. The polling is communication method in which the client inquires of the server as to whether there is information which is to be transmitted from the server to the client, and the server transmits information which is to be transmitted to the client in accordance with the inquiry. More specifically, in order to synchronize the content playback in each client in response to operation with any one of the clients, even if the server determines the playback control time, the server can transmit the playback control information only in the mode in which the server responds to the HTTP request from the client. Therefore, even if the playback control time is determined on the basis of the maximum time it takes for the playback control information to be delivered from the server to the client, the time when the client sends HTTP request to the server may be later than the playback control time, and when the client sends inquiry, the playback control time may be already over.

A method of polling includes a method for causing a server to receive an HTTP request and thereafter causes the server to wait and then causes the server to return a response in reply to the HTTP request. This method is called long polling.

The server cannot transmit information to a client from when the server transmits, to the client, a response in reply to an inquiry (HTTP request) from the client to when the server receives an inquiry from the client again. When the long polling is employed, the server can transmit information to the source of transmission of the inquiry by transmitting a response in reply to an inquiry as long as it is in a waiting period after reception of the inquiry. However, even when the long polling is employed, the server cannot transmit information to the source of transmission of the inquiry from when the server transmits a response to the client to when the server receives an inquiry again.

FIG. 18 is a schematic diagram illustrating a period in which the server cannot transmit information to the client of the source of transmission of the inquiry when the long polling is employed. In FIG. 18, the horizontal axis denotes an elapse of time. In FIG. 18, an arrow from each client to the server represents transmission/reception of an inquiry. In FIG. 18, an arrow from the server to each client represents transmission/reception of a response from the server. It should be noted that transmission/reception between the client A and the server is denoted with an arrow of a solid line, and transmission/reception between the client B and the server is denoted with an arrow of a broken line. A period T1 shown in FIG. 18 is a period in which the server cannot transmit information to the client A. On the other hand, a period T2 is a period in which the server cannot transmit information to the client B. As can be understood from FIG. 18, when the number of clients increases, the period in which the server cannot transmit information to any one of the clients increases. In other words, the period in which the server can transmit information to all the clients at a time decreases, and this reduces the chance of transmitting information to all the clients at a time.

Even when long polling is employed under HTTP, it is preferable to enable synchronization of content control in multiple content playback devices (client). However, as described above, there is a problem in that it is difficult to determine a time when each client starts content control in a synchronized manner, and there is a problem in that when the number of clients increases, this reduces the chance of transmission of information to the clients at a time.

In a case where HTTP is applied to the technique (PLT 3) for transmitting a command concerning video data by a user computer to another user computer, the user computer which transmits the command cannot recognize the time at which the computer receiving the command transmits the HTTP request to the server in the mode in which the command is transmitted via a content providing device such as the server. For this reason, the user computer which transmits the command cannot calculate the playback control time.

Accordingly, it is an object of the present invention to provide a content synchronization system in which, when long polling is employed under HTTP, a content-synchronization control device can control each content playback device so that content control is synchronized in multiple content playback devices, and to provide a content-synchronization control device, a content playback device, a content synchronization method, a content-synchronization control method, a content playback method, a content-synchronization control program, and a content playback program which are applied to the content synchronization system.

Solution to Problem

A content synchronization system according to the present invention includes a plurality of content playback devices configured to play a content, and a content-synchronization control device for synchronizing content control with the plurality of content playback devices, wherein the content-synchronization control device includes request information reception means configured to receive, from each content playback device, request information for requesting each content playback device to execute a playback control command which is a command concerning playback control of the content in a synchronized manner, inquiry reception means configured to receive an inquiry for determining presence/absence of playback control command transmitted to the content playback device from each content playback device, inquiry response transmission means configured to transmit an inquiry response which is a response in reply to the inquiry to the content playback device of the source of transmission of the inquiry, response control means configured to cause the inquiry response transmission means to wait transmission of the inquiry response in reply to the inquiry for a certain period of time since reception of the inquiry, and when a certain period of time passes since reception of the inquiry and the waiting state of the transmission of the inquiry response in reply to the inquiry is to be cancelled, the waiting state of the transmission of all the inquiry responses is cancelled, and start time determination means configured to determine a start time when each content playback device starts the content control in accordance with the playback control command indicated by the request information received by the request information reception means, wherein when the request information reception means receives the request information, the response control means cancels the waiting state of the transmission of each inquiry response when the following condition is satisfied: the transmission of each inquiry response to each content playback device is kept waiting, and when the condition is satisfied and the waiting state of the transmission of each inquiry response to each content playback device is cancelled, the inquiry response transmission means transmits the inquiry response including the playback control information including the information about the start time determined with regard to the playback control command and the playback control command indicated by the request information, each content playback device includes request information transmission means configured to transmit the request information to the content-synchronization control device, inquiry transmission means configured to transmit the inquiry to the content-synchronization control device, inquiry response reception means configured to receive the inquiry response transmitted by the inquiry response transmission means in reply to the inquiry, and playback control means, wherein when the inquiry response includes playback control information, the playback control means starts the content control in accordance with the playback control command indicated by the playback control information, at the start time indicated by the playback control information, wherein the inquiry transmission means transmits the inquiry again when the inquiry response reception means receives the inquiry response.

A content-synchronization control device according to the present invention is a content-synchronization control device for synchronizing content control with a plurality of content playback devices, including request information reception means configured to receive, from each content playback device, request information for requesting each content playback device to execute a playback control command which is a command concerning playback control of the content in a synchronized manner, inquiry reception means configured to receive an inquiry for determining presence/absence of playback control command transmitted to the content playback device from each content playback device, inquiry response transmission means configured to transmit an inquiry response which is a response in reply to the inquiry to the content playback device of the source of transmission of the inquiry, response control means configured to cause the inquiry response transmission means to wait transmission of the inquiry response in reply to the inquiry for a certain period of time since reception of the inquiry, and when a certain period of time passes since reception of the inquiry and the waiting state of the transmission of the inquiry response in reply to the inquiry is to be cancelled, the waiting state of the transmission of all the inquiry responses is cancelled, and start time determination means configured to determine a start time when each content playback device starts the content control in accordance with the playback control command indicated by the request information received by the request information reception means, wherein when the request information reception means receives the request information, the response control means cancels the waiting state of the transmission of each inquiry response when the following condition is satisfied: the transmission of each inquiry response to each content playback device is kept waiting, and when the condition is satisfied and the waiting state of the transmission of each inquiry response to each content playback device is cancelled, the inquiry response transmission means transmits the inquiry response including the playback control information including the information about the start time determined with regard to the playback control command and the playback control command indicated by the request information.

A content playback device according to the present invention is a content playback device for playing a content, including request information transmission means configured to transmit the request information for requesting each content playback device to execute a playback control command which is a command concerning playback control of the content in a synchronized manner to the content-synchronization control device for synchronizing content control with a plurality of content playback devices, inquiry transmission means configured to transmit the inquiry for determining presence/absence of the playback control command which is to be transmitted to the content playback device to the content-synchronization control device, inquiry response reception means configured to receive the inquiry response transmitted by the content-synchronization control device in reply to the inquiry, and playback control means, wherein when the inquiry response includes the playback control command and the information about the start time of the content control according to the playback control command, the playback control means starts the content control in accordance with the playback control command at the start time, wherein the inquiry transmission means transmits the inquiry again when the inquiry response reception means receives the inquiry response.

A content synchronization method according to the present invention for causing each of a plurality of content playback devices playing a content to transmit, to a content-synchronization control device, an inquiry for determining presence/absence of a playback control command which is to be transmitted to the content playback device, wherein the content-synchronization control device waits transmission of the inquiry response in reply to the inquiry for a certain period of time since reception of the inquiry, and when a certain period of time passes since reception of the inquiry and the waiting state of the transmission of the inquiry response in reply to the inquiry is to be cancelled, the waiting state of the transmission of all the inquiry responses is cancelled, and the content-synchronization control device receives the request information, when any one of the content playback devices transmits request information for requesting each content playback device to execute a playback control command which is a command concerning playback control of the content in a synchronized manner, and when a condition that the transmission of each inquiry response to each content playback device is kept waiting is satisfied after reception of the request information, the content-synchronization control device determines a start time when each content playback device starts the content control in accordance with the playback control command indicated by the request information, and the content-synchronization control device cancels the waiting state of the transmission of each inquiry response, and transmits each inquiry response including the playback control information including the information about the start time determined with regard to the playback control command and the playback control command, when each content playback device receives the inquiry response from the content-synchronization control device, the content playback device transmits the inquiry to the content-synchronization control device again, and when the received inquiry response includes the playback control information, each content playback device starts the content control in accordance with the playback control command indicated by the playback control information at the start time indicated by the playback control information.

A content synchronization control method according to the present invention, wherein a content-synchronization control device receives an inquiry for determining presence/absence of a playback control command transmitted to a content playback device of the source of transmission of the inquiry, which is an inquiry transmitted from a plurality of content playback devices playing a content, the content-synchronization control device waits transmission of the inquiry response in reply to the inquiry for a certain period of time since reception of the inquiry, and when a certain period of time passes since reception of the inquiry and the waiting state of the transmission of the inquiry response in reply to the inquiry is to be cancelled, the waiting state of the transmission of all the inquiry responses is cancelled, when receiving from any one of the playback control devices, request information for requesting each content playback device to execute a playback control command which is a command concerning playback control of the content in a synchronized manner, the content-synchronization control device determines a start time when each content playback device starts the content control in accordance with the playback control command indicated by the request information when a condition that the transmission of each inquiry response to each content playback device is kept waiting is satisfied, and the content-synchronization control device cancels the waiting state of the transmission of each inquiry response, and transmits each inquiry response including the playback control information including the information about the start time determined with regard to the playback control command and the playback control command.

A content playback method according to the present invention, wherein a content playback device playing a content transmits request information for requesting each content playback device to execute a playback control command which is a command concerning playback control of the content in a synchronized manner, to a content-synchronization control device for synchronizing content control with a plurality of content playback devices, the content playback device transmits, to the content-synchronization control device, the inquiry for determining presence/absence of the playback control command transmitted to the content playback device, the content playback device receives the inquiry response transmitted by the content-synchronization control device in response to the inquiry, the content playback device transmits the inquiry to the content-synchronization control device again, and when the inquiry response includes a generation control command and information about the start time of the content control according to the playback control command, the content playback device starts the content control in accordance with the playback control command at the start time.

A content synchronization control program according to the present invention for causing a computer to execute response control processing in which when receiving, from each content playback device, an inquiry for determining presence/absence of a playback control command transmitted to a content playback device, transmission of the inquiry response in reply to the inquiry is kept waiting for a certain period of time since reception of the inquiry, and when a certain period of time passes since reception of the inquiry and the waiting state of the transmission of the inquiry response in reply to the inquiry is to be cancelled, the waiting state of the transmission of all the inquiry responses is cancelled, request information reception processing for receiving, from each content playback device, request information for requesting each content playback device to execute a playback control command which is a command concerning playback control of the content in a synchronized manner, and playback control information transmission processing in which when a condition that the transmission of each inquiry response to each content playback device is kept waiting is satisfied after reception of the request information, determining a start time when each content playback device starts the content control in accordance with the playback control command indicated by the request information, and canceling the waiting state of the transmission of each inquiry response, and transmitting each inquiry response including the playback control information including the information about the start time determined with regard to the playback control command and the playback control command.

A content playback program according to the present invention for causing a computer to execute request information transmission processing for transmitting request information for requesting a playback control command which is a command for playback control of a content to be executed in a plurality of computers in a synchronized manner, to a content-synchronization control device for synchronizing the content control with the plurality of computers, inquiry transmission processing for transmitting an inquiry for determining presence/absence of a playback control command transmitted to the computer, to the content-synchronization control device, inquiry response reception processing for receiving an inquiry response transmitted by the content-synchronization control device in response to the inquiry, and playback control processing in which when the inquiry response includes the playback control command and the information about the start time of the content control according to the playback control command, the content control according to the playback control command is started at the start time, wherein after the inquiry response reception processing, the inquiry transmission processing is executed again.

Advantageous Effects of Invention

According to the present invention, when long polling is employed under HTTP, a content-synchronization control device can control each content playback device so that content control is synchronized in multiple content playback devices.

BRIEF DESCRIPTION OF DRAWINGS

FIG. 3 It depicts an explanatory diagram illustrating an example of communication delay information.

FIG. 4 It depicts an explanatory diagram illustrating an example of playback control command.

FIG. 5 It depicts an explanatory diagram illustrating an example of playback control information.

FIG. 6 It depicts an explanatory diagram illustrating an example of information stored by control information management means 107.

FIG. 12 It depicts an explanatory diagram illustrating an example of playback control information stored by control time determination means 106.

DESCRIPTION OF EMBODIMENTS

Figure 1:
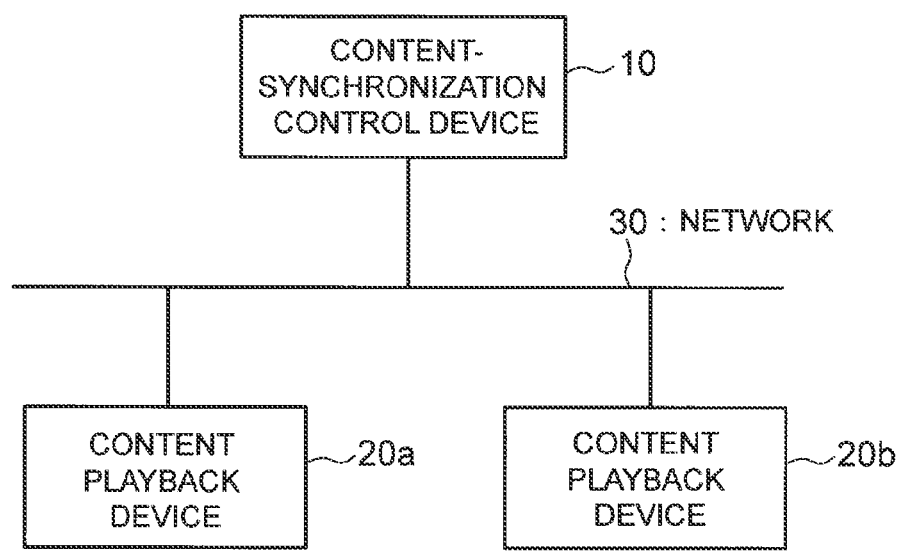
FIG. 1 It depicts a block diagram illustrating an example of a content synchronization system of the present invention.

FIG. 1 is a block diagram illustrating an example of a content synchronization system of the present invention. A content synchronization system of the present invention includes a content-synchronization control device 10 and multiple content playback devices 20a, 20b. FIG. 1 illustrates two content playback devices 20a, 20b, but three or more content playback devices may be provided. The content-synchronization control device 10 and the multiple content playback devices 20a, 20b are connected via a network 30. The content-synchronization control device 10 and the multiple content playback devices 20a, 20b communicate according to HTTP. The content synchronization system of the present invention employs long polling for communication between the content-synchronization control device 10 and each of the content playback devices 20a, 20b. The content-synchronization control device 10 is a server in a server/client system, and will be hereinafter referred to as a server 10. Each of the content playback devices 20a, 20b is a client in the server/client system, and are hereinafter referred to as client terminals 20a, 20b.

The client terminals 20a, 20b are, for example, terminals located away from each other, but the physical distance between the client terminals is not particularly limited.

The client terminals 20a, 20b, for example, reproduce a content on a generally-used browser.

The client terminals 20a, 20b download, for example, the same content from the server 10, and each of them reproduces the content. It should be noted that the content may be either motion picture or sound. The server 10 controls each of the client terminals 20a, 20b, so that, each of the client terminals 20a, 20b executes various commands of the content playback (for example, commands such as playback start, pause, and the like) at the same time. Hereinafter, a command concerning content playback control will be referred to as a playback control command. The server 10 determines a time when each of the client terminals 20a, 20b starts content control based on playback control command (which may be hereinafter referred to as control start time), and transmits playback control information, which is information including a control start time thereof and a playback control command, to each of the client terminals 20a, 20b.

However, HTTP is used for communication between the server 10 and the client terminals 20a, 20b. Therefore, the server 10 receives the inquiry for determining presence/absence of the playback control command (HTTP request) from each client terminal, and transmits the response to the client terminal of the source of the inquiry. The server 10 incorporates, into the response in reply to the inquiry from each client terminal, the playback control information (information about the control start time and the playback control command), thus transmitting the playback control information to each client terminal. When there is no playback control command which is to be transmitted to the client terminal during transmission of response to the client terminal, the server 10 transmits the response to the client terminal without incorporating the playback control information into the response in reply to the inquiry.

In the present invention, the long polling is employed in the communication between the server and the client, and therefore, after the server 10 receives the inquiry, the server once waits, and then transmits the response in reply to the inquiry.

How the server 10 transmits the response to the client terminal without including the playback control information and the details of how the server 10 transmits the response to the client terminal with the playback control information included in the response will be explained with reference to the sequence diagram.

When the response transmitted by the server 10 in reply to the inquiry to the server 10 includes the playback control information, the client terminals 20a, 20b starts content control based on the playback control command at the control start time designated by the playback control information. As a result, various kinds of operations about playback such as playback and pause with the client terminals 20a, 20b are synchronized. Hereinafter, the response transmitted by the server 10 in reply to the inquiry for determining presence/absence of the playback control command transmitted will be referred to as an inquiry response. The content control may also be referred to as control of the playback state of the content.

Figure 2:
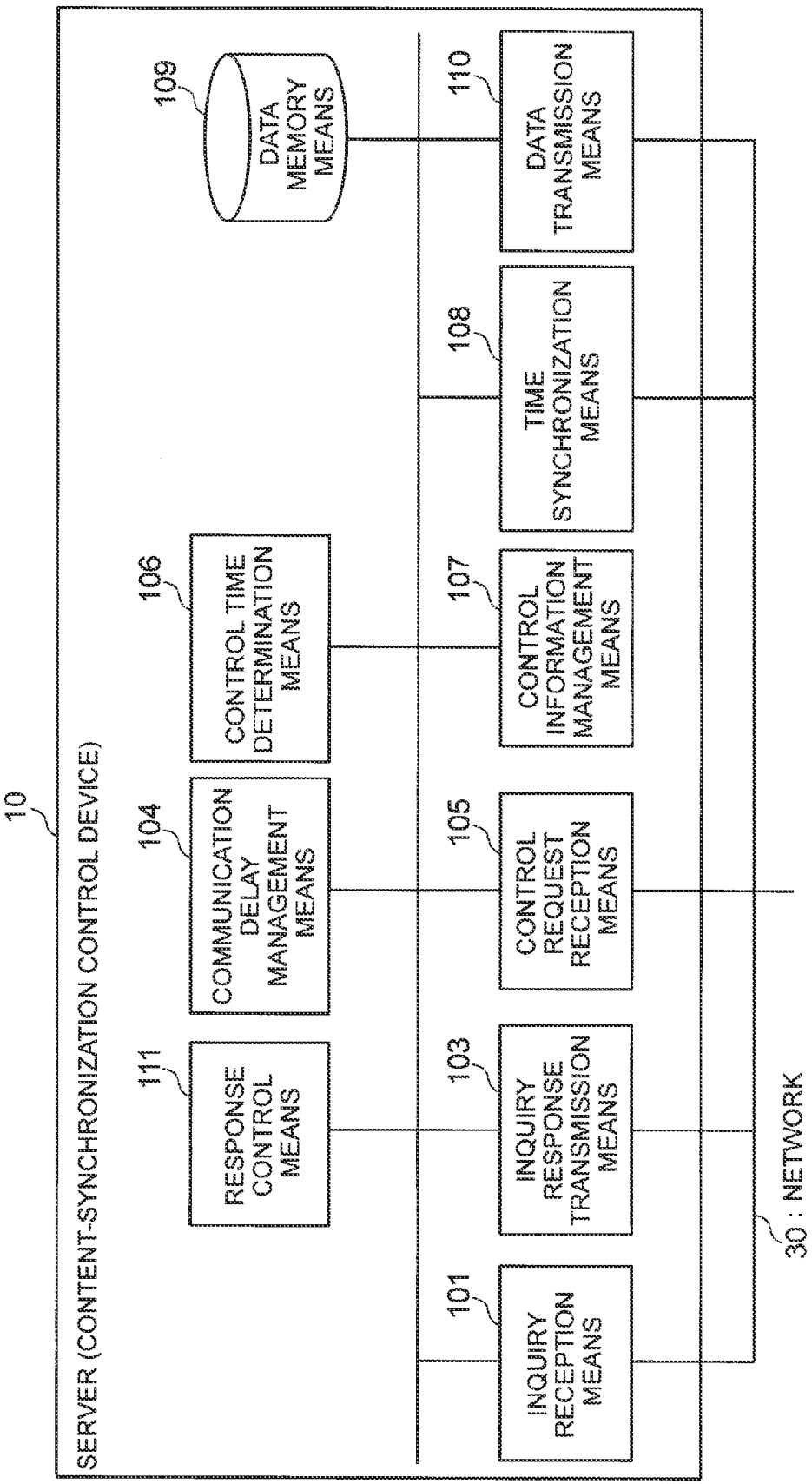
FIG. 2 It depicts a block diagram illustrating an example of configuration of a content-synchronization control device.

FIG. 2 is a block diagram illustrating an example of configuration of a server (content-synchronization control device) 10. The server 10 includes inquiry reception means 101, inquiry response transmission means 103, response control means 111, communication delay management means 104, control request reception means 105, control time determination means 106, control information management means 107, time synchronization means 108, data memory means 109, and data transmission means 110. The server 10 is connected to a client terminal (not shown in FIG. 2) via the network 30.

The inquiry reception means 101 receives the inquiry for determining presence/absence of playback control command which is to be transmitted to the client terminal from each of the client terminals 20a, 20b. It should be noted that each of the clients 20a, 20b may transmit an inquiry to the server 10 by, for example, GET method of HTTP.

The inquiry response transmission means 103 transmits a response in reply to the inquiry received by the inquiry reception means 101 to the client terminal which is the source of transmission of the inquiry. The inquiry response transmission means 103 transmits the inquiry response according to the response control means 111. When a playback control command which is to be transmitted to each client terminal occurs, and a condition for transmitting the playback control command as playback control information is satisfied, the inquiry response transmission means 103 transmits, to the client terminal, the inquiry response including the playback control information according to the response control means 111. When such playback control command does not occur, the inquiry response transmission means 103 transmits the inquiry response without the playback control information being included in the inquiry response according to the response control means 111. The playback control information is generated by the control time determination means 106.

For a certain period of time from the inquiry reception time, the response control means 111 causes the inquiry response transmission means 103 to wait without transmitting the inquiry response in reply to the inquiry. Then, when the certain period of time passes, the response control means 111 causes the inquiry response transmission means 103 to transmit the inquiry response to the source of transmission of the inquiry. Therefore, the long polling is achieved by the response control means 111. However, when the certain period of time passes after the reception of an inquiry, and the waiting state of the transmission of the inquiry response in reply to the inquiry is cancelled, the response control means 111 cancels the waiting state with regard to transmission of all the inquiry responses kept in the waiting state. Therefore, the response control means 111 holds the transmission of the inquiry response in reply to the inquiry (which will be referred to as I) in the waiting state for the certain period of time passes after reception of the inquiry, but when the waiting state of the transmission of an inquiry response in reply to another inquiry (which will be referred to as J) is cancelled, the response control means 111 preferentially cancels the waiting state and performs transmission with regard to the inquiry response I upon the inquiry response J instead of waiting for elapse of the certain period of time.

When the control request reception means 105 receives the playback control request, the response control means 111 cancels the waiting state of the transmission of all the inquiry responses when the inquiry from each of the client terminals 20a, 20b is received, and a condition that the transmissions of all the inquiry responses to the client terminals 20a, 20b are held in the waiting state is satisfied. More specifically, the response control means 111 transmits all the inquiry responses to the client terminals 20a, 20b. For example, the response control means 111 searches the client terminals to which the inquiry response in reply to the inquiry has not yet been returned from the server 10, and when all the client terminals which are the targets for synchronizing the content control can be found as the search result, the inquiry responses are transmitted to all the client terminals.

The playback control request is request information for requesting control of each client terminal so that a designated playback control command is executed in a synchronous manner in each client terminal. Each of the client terminals 20a, 20b can transmit a playback control request to the server 10, for example, by designating the playback control command in accordance with user's operation. In the present exemplary embodiment, for example, each of the client terminals 20a, 20b transmits a playback control command as a playback control request.

The communication delay management means 104 holds the communication delay information. The communication delay information includes at least the identifier of the client terminal and communication delay between the client terminal and the server 10. The communication delay is a time required by two-way communication between the client terminal and the server 10. In the explanation about the present invention, "communication delay" and "communication delay information" including the communication delay are distinguished from each other. FIG. 3 is an explanatory diagram illustrating an example of communication delay information held by communication delay management means 104. FIG. 3 shows a case where the communication delay information is information for associating, for each client terminal, the identifier of the client terminal, the communication delay, and the previous inquiry response transmission time to the client terminal. The first column shown in FIG. 3 is the identifier of the client terminal. In this example, reference numerals "20a", "20b" as shown in FIG. 1 are indicated as identifiers. The second column as shown in FIG. 3 is the communication delay, and, in this example, this is indicated in units of milliseconds. The third column as shown in FIG. 3 is the previous inquiry response transmission time for the client terminal. This time is used to measure the communication delay. In the present exemplary embodiment, the time is represented by an elapsed time since a predetermined reference point in time previously defined. In this example, 0:0:0 on Jan. 1, 1970 of Greenwich mean time is adopted as a reference point in time, and the elapsed time since the reference point in time is represented in milliseconds to represent the time. However, other times may be used as the reference point in time. The elapsed time since the reference point in time may be represented in a unit other than milliseconds. However, the unit of the communication delay and the unit of the elapsed time since the reference point in time are preferably of the same unit (in this example, milliseconds).

The communication delay management means 104 uses, for example, the inquiry from the client terminal and the response in reply to the inquiry to measure the communication delay. This measurement method will be explained using a specific example. After the server 10 receives an inquiry from the client terminal 20a, the inquiry response transmission means 103 transmits an inquiry response to the client terminal 20a. Then, when the inquiry response transmission means 103 transmits the inquiry response, the communication delay management means 104 updates the "previous inquiry response transmission time" corresponding to the client terminal 20a with the transmission time. As described above, every time the inquiry response is transmitted to each of the client terminals, the communication delay management means 104 updates the "previous inquiry response transmission time" corresponding to the client terminal in the communication delay information. After the update, suppose that the content of the communication delay information changes to the content as shown in FIG. 3. Then, when the client terminal 20a receives an inquiry response from the server 10, the client terminal 20a stores the reception time. Thereafter, the client terminal 20a transmits an inquiry to the server 10 again. At that occasion, the client terminal 20a gives, to the inquiry, the elapsed time from when the inquiry response is received to when the inquiry is transmitted. This elapsed time is transmitted as, for example, URL (Uniform Resource Locator) parameter. For example, when the elapsed time is X milliseconds, the client terminal 20a gives "time=X" to the URL during the inquiry transmission to make "http://example.com/GetMessage?time=X", whereby the client terminal 20a may transmit, to the server 10, that the elapsed time is X milliseconds.

When the inquiry reception means 101 of the server 10 receives an inquiry from the client terminal 20a, the communication delay management means 104 checks the time when the inquiry is received. For example, suppose that this time is "1308637151453". The communication delay management means 104 refers to the "previous inquiry response transmission time" corresponding to the client terminal 20a. In this example, this time is "1308637151322" (see FIG. 3). The communication delay management means 104 can calculate the communication delay as the value obtained by subtracting the previous inquiry response transmission time and the elapsed time notified by the client terminal 20a (in the above example, X milliseconds) from the time when the inquiry is received from the client terminal 20a. More specifically, in this example, according to the following expression (1), the communication delay of the client terminal 20a can be calculated. In the expression (1), d denotes a communication delay.

$$d = 1308637151453 - 1308637151322 - X \quad \text{expression (1)}$$

When the communication delay management means 104 calculates the communication delay, the communication delay management means 104 updates the communication delay included in the communication delay information held. As described above, when the inquiry reception means 101 receives an inquiry from the client terminal, the communication delay management means 104 calculates the communication delay of the client terminal and updates the communication delay information.

It should be noted that the communication delay management means 104 may measure the communication delay according to the method explained above, adopt, as the communication delay, that the average value of the measurement results obtained from multiple measurements, and update the communication delay included in the communication delay information with the average value thereof. As described above, when the communication delay exceptionally increases due to packet loss, which makes it impossible to correctly measure the normal communication delay, and in such case, such adverse influence can be alleviated by defining the communication delay.

The control request reception means 105 receives the playback control request from each of the client terminals 20a, 20b. Each client terminal may transmit, to the server 10, the playback control command which is determined in accordance with user's operation as the playback control request. Examples of playback control commands include playback control commands according to various kinds of processing such as playback, pause, fast-forward, fast-reverse, and cue playback. However, the type of playback control command is not limited thereto. The playback control command may be added with supplementary information. The supplementary information is, for example, information designating the execution mode of the command. Examples of supplementary information include a playback speed of the playback control command for commanding the playback, and the cue position of the playback control command commanding the cue playback. The type of supplementary information is not limited thereto.

FIG. 4 is an explanatory diagram illustrating an example of playback control command. In the example as illustrated in FIG. 4, each row is described in a format of "parameter name=parameter value". A parameter value of which parameter name is indicated by "command" represents a playback control command. Then, other parameter names represent supplementary information of the playback control command. In example 1 as illustrated in FIG. 4, a command name "command" is designated in the first row, and the parameter value thereof is "pause", and example 1 is a command for commanding start of pause. In example 2 as illustrated in FIG. 4, a command name "command" is designated in the first row, and the parameter value thereof is "seek", and example 2 is a command for commanding start of cue playback. In example 2, "position=2300" is described in the second row as supplementary information, and this indicates that cue playback is carried out at the position 2300 milliseconds after the start of the motion picture. In example 3 as illustrated in FIG. 4, a command name "command" is designated in the first row, and the parameter value thereof is "forward", and example 3 is a command for commanding start of fast-forward. In example 3, "speed=4" is described in the second row as supplementary information, and this indicates that fast-forward is done at quad-speed.

By adding the supplementary information, the execution mode of the command can be designated, and not only the start timing of the content control in each client terminal but also the execution mode can be aligned. Therefore, even when the execution mode of the command can be changed, each client terminal can output the same portion of the same content in a synchronous manner. For example, when each client terminal performs cue playback, the client terminal starts playback of the content from the same portion, and can output the same portion of the content at the same time.

The playback control command and the supplementary information are not limited to the example as shown in FIG. 4. Moreover, the description format of the playback control command and the supplementary information is not limited to the example as shown in FIG. 4, and they may be described in other formats.

The control time determination means 106 determines the control start time at which each of the client terminals 20a, 20b starts the content control according to the playback control command received by the control request reception means 105 as the playback control request. Then, the control time determination means 106 adds information about the control start time to the playback control command, thus generating the playback control information. More specifically, the playback control information includes information about the playback control command and the control start time. The playback control command may be added with supplementary information. The determination method of the control start time will be explained later.

FIG. 5 is an explanatory diagram illustrating an example of playback control information generated by control time determination means 106. In the example as shown in FIG. 5, the description of the playback control command and the supplementary information is the same as the example as shown in FIG. 4. The playback control information as shown in FIG. 5 is different from the example as shown in FIG. 4 in that a control start time is added with the parameter name being "time". In example 1 as shown in FIG. 5, "1308637152032" is designated as the control start time. Example 1 means the control (pause in example 1) is started at the time when 1308637152032 milliseconds has elapsed since 0:0:0 on Jan. 1, 1970 of Greenwich mean time. Likewise, example 2 as illustrated in 5 means that the cue playback is started from the position 2300 milliseconds after the start of the content at the time "1308637165983". Likewise, example 3 as illustrated in 5 means that the fast-forward is started with quad-speed at the time "1308637178111".

When the control request reception means 105 receives playback control request (i.e., playback control command), the control information management means 107 stores the playback control command. When the control time determination means 106 generates playback control information obtained by adding the control start time to the playback control command, the control information management means 107 stores the playback control information including the playback control command and the control start time. FIG. 6 is an explanatory diagram illustrating an example of information stored by control information management means 107. The example as illustrated in FIG. 6 shows an example where a playback control command having no control start time attached thereto is stored.

The time synchronization means 108 synchronizes the time of the clock of the server 10 with a predetermined time, thus synchronizing the time of the clock of the server 10 with the correct time. For example, the time synchronization means 108 may refer to an NTP server (network time protocol server, not shown), and may synchronize the time of the clock of the server 10 with the time provided by the NTP server according to a network time protocol.

The time synchronization means 206 of the client terminal (see FIG. 7) also synchronizes the time of the clock of the client terminal with a predetermined time, thus synchronizing the time of the clock of the client terminal with the correct time. Therefore, the times of the clocks of the server 10 and each client terminal are synchronized, and indicate the same time. Then, all the client terminals 20a, 20b start content control (for example, playback, pause) according to the playback control command at the time determined by the control time determination means 106, and therefore, all the client terminals 20a, 20b can start the content control according to the playback control command at the same time.

The data memory means 109 stores data of the content reproduced by each of the client terminals 20a, 20b. The data memory means 109 stores data, for example, motion picture, and sound.

The data transmission means 110 transmits data of the content to each of the client terminals 20a, 20b.

The inquiry reception means 101, the inquiry response transmission means 103, the response control means 111, the communication delay management means 104, the control request reception means 105, the control time determination means 106, control information management means 107, the time synchronization means 108, and the data transmission means 110 are, for example, achieved with a CPU of a computer operating according to the content-synchronization control program. In this case, for example, the program memory means (not shown) of the computer stores a content-synchronization control program, and the CPU reads the program, and in accordance with the program, the CPU may operate as each of the elements 101, 103, 111, 104, 105, 106, 107, 108, 110. Alternatively, each of the elements may be realized as a separate unit.

Figure 7:
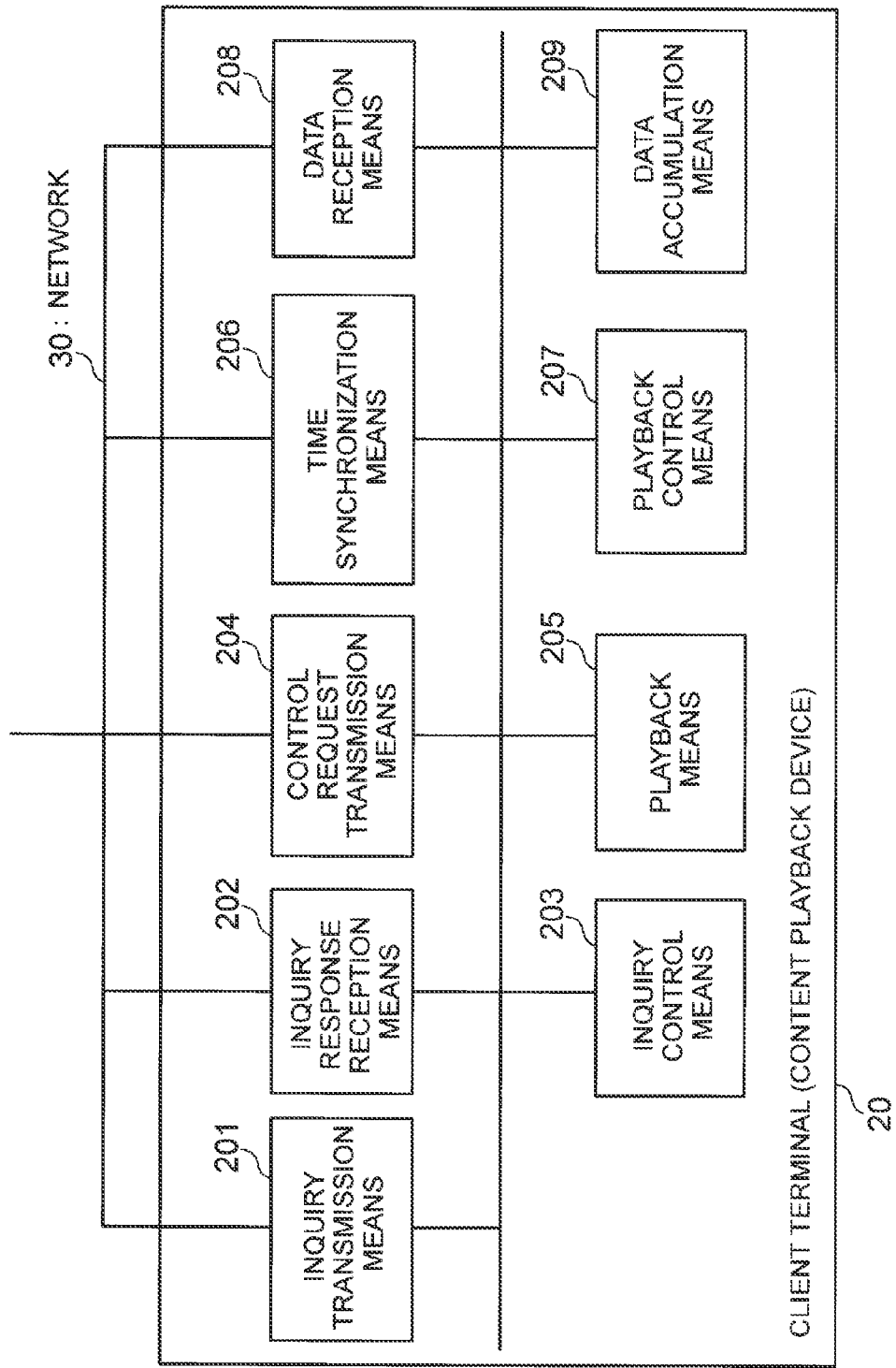
FIG. 7 It depicts a block diagram illustrating an example of configuration of a content playback device.

FIG. 7 is a block diagram illustrating an example of configuration of a client terminal (content playback device) 20. In FIG. 7, the client terminal is represented with reference numeral "20". Each of the client terminals 20a, 20b as shown in FIG. 1 is the same as the client terminal 20 as shown in FIG. 7.

The client terminal 20 includes inquiry transmission means 201, inquiry response reception means 202, inquiry control means 203, control request transmission means 204, playback means 205, time synchronization means 206, playback control means 207, data reception means 208, and data accumulation means 209. The client terminal 20 is connected to the server 10 (not shown in FIG. 7) via the network 30.

The inquiry transmission means 201 transmits, to the server 10, the inquiry for determining presence/absence of the playback control command transmitted from the server to the terminal of itself (client terminal 20). The inquiry transmission means 201 performs this transmission processing in accordance with the inquiry control means 203. The inquiry transmission means 201 incorporates, into the inquiry to the server 10, the elapsed time from the reception time of the most recent inquiry response to the transmission time of the inquiry.

The inquiry response reception means 202 receives a response in reply to the inquiry transmitted by the inquiry transmission means 201 to the server 10 (inquiry response) from the server 10. When the server 10 has a playback control command that is to be transmitted to the client terminal 20, the playback control information including the playback control command and the control start time is included in the inquiry response. When the server 10 does not have a playback control command that is to be transmitted to the client terminal 20, the playback control information is not included in the inquiry response received from the server 10.

The inquiry control means 203 controls the timing with which the inquiry transmission means 201 transmits inquiry to the server 10. More specifically, when the inquiry response reception means 202 receives the inquiry response from the server 10, the inquiry control means 203 causes the inquiry transmission means 201 to transmit the inquiry which is to be transmitted to the server 10.

The control request means 204 transmits the playback control command corresponding to the user's operation of the client terminal 20 to the server 10 as the playback control request. For example, when the user of the client terminal 20 performs operation for commanding the playback start, the control request means 204 transmits the playback control command for commanding the playback start as the playback control request. Likewise, the control request means 204 transmits various kinds of playback control commands such as pause, fast-forward, fast-reverse, cue playback as the playback control request to the server 10 in response to the user's operation.

The playback means 205 executes playback, pause, fast-forward, fast-reverse, cue playback, and the like of the content on the basis of the command of the playback control means 207. The playback means 205 may perform playback and the like of contents with a generally-available web browser, for example.

The time synchronization means 206 synchronizes the time of the clock of the client terminal 20 with a predetermined time, thus synchronizing the time of the clock of the client terminal 20 with the correct time. This operation is the same as the time synchronization means 108 of the server.

The playback control means 207 controls the playback state of the content with the playback means 205 on the basis of the playback control information received by the inquiry response reception means 202.

The data reception means 208 receives the content played with the playback means 205 from the server 10.

The data accumulation means 209 accumulates the contents received with the data reception means 208, and gives the contents to the playback means 205.

The inquiry transmission means 201, the inquiry response reception means 202, the inquiry control means 203, the control request transmission means 204, the playback means 205, the time synchronization means 206, the playback control means 207, the data reception means 208, and the data accumulation means 209 are, for example, achieved with a CPU of a computer operating according to the content playback program. In this case, for example, program memory means of a computer (not shown) stores the content playback program, and the CPU reads the program, and in accordance with the program, the CPU may operate as each of the elements 201 to 209. Alternatively, each of the elements may be realized as a separate unit.

The present exemplary embodiment shows an example where the content reproduced by each client terminal is stored to the data memory means 109 of the server 10 (see FIG. 2), and the data reception means 208 of each client terminal receives the content from the server 10. The content is stored to a device different from the server 10, and the data reception means 208 of each client terminal may receive the content from the device. It may be configured such that any one of the client terminals stores the content, and the content is transmitted and received by the client terminal and each of the other client terminals.

Subsequently, operation will be explained. In the explanation below, suppose that the time synchronization means 108 of the server 10 and the time synchronization means 206 of each of the client terminals 20a, 20b synchronize the time of the clock of each of the devices with a predetermined time (for example, the time of the NTP server). More specifically, suppose that the times of the clocks of all of the server 10 and each of the client terminals 20a, 20b are already synchronized with the correct time. In each of the client terminals 20a, 20b, suppose that the data reception means 208 receives the content from the data transmission means 101 of the server 10, and the data accumulation means 209 has already accumulated the content.

In the explanation below, an operation in which the server 10 transmits an inquiry response not including the playback control information in reply to the inquiry from the client terminal, and an operation in which the server 10 transmits an inquiry response including the playback control information in reply to the inquiry from the client terminal will be explained.

Figure 8:
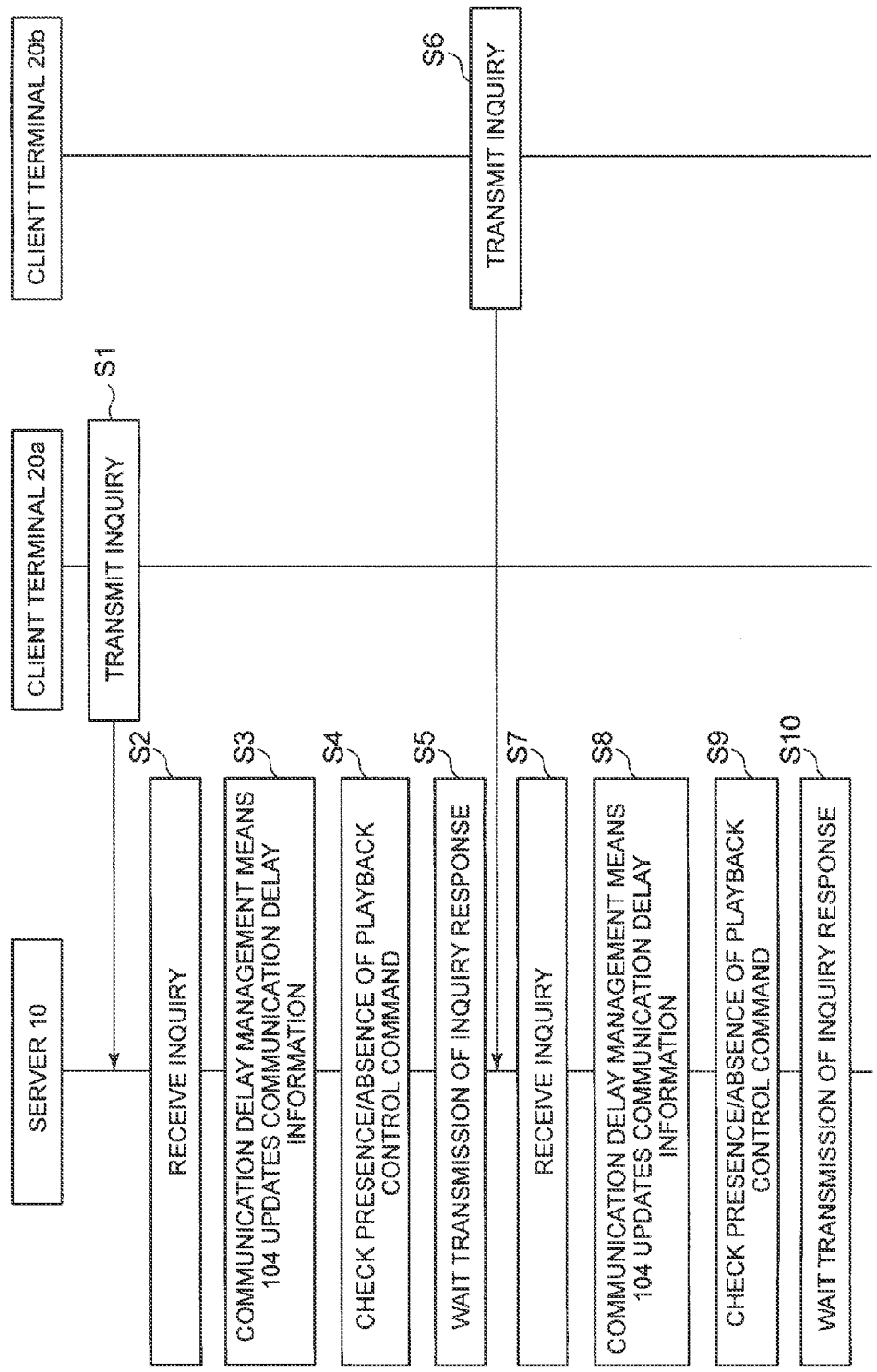
FIG. 8 It depicts a sequence diagram illustrating an example of operation in a case where a server 10 transmits an inquiry response not including playback control information.
Figure 9:
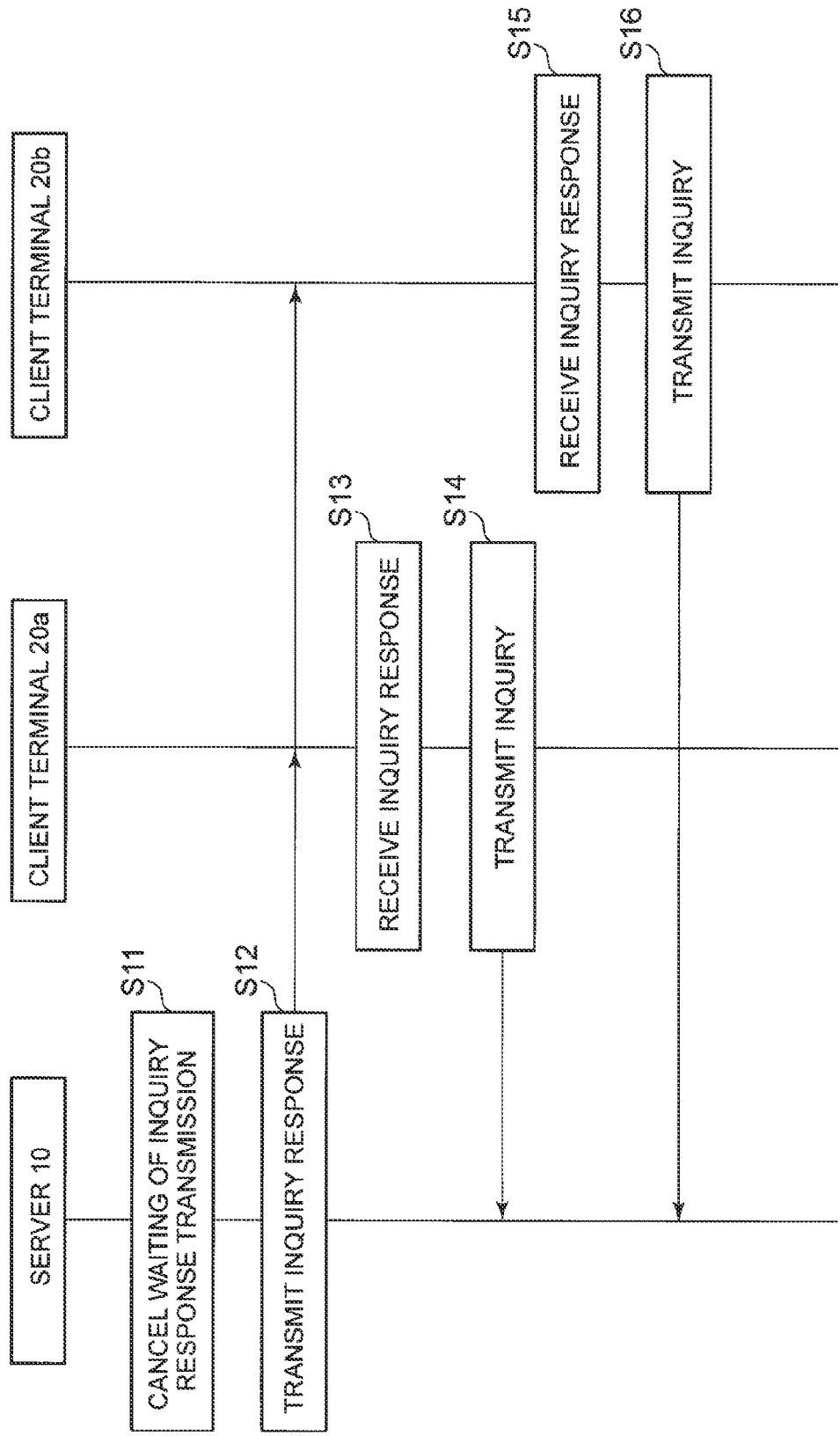
FIG. 9 It depicts a sequence diagram illustrating an example of operation in a case where a server 10 transmits an inquiry response not including playback control information.

FIGS. 8 and 9 are sequence diagrams illustrating an example of operation in a case where the server 10 transmits an inquiry response not including playback control information in reply to the inquiry from the client terminal. When user's operation is not performed in any one of the client terminals 20a, 20b, processing is performed as shown in FIGS. 8 and 9.

The inquiry transmission means 201 of the client terminal 20a transmits, to the server 10, an inquiry for determining presence/absence of playback control command which is to be transmitted from the server 10 to the client terminal 20a (step S1). At this occasion, the inquiry transmission means 201 adds, to the inquiry, information about the elapsed time from the most recent inquiry response reception time to the transmission time of the inquiry in step S1.

The inquiry reception means 102 of the server 10 receives the inquiry transmitted by the client terminal 20a (step S2). In step S2, the response control means 111 of the server 10 stores the client terminal 20a as the client terminal to which the inquiry response in reply to the received inquiry has not yet been transmitted from the server 10.

Before step S2, suppose that the server 10 has not yet received the inquiry from each client terminal. More specifically, in this example, the server 10 receives the first inquiry from the client terminal 20a. When the reception order of the inquiry is counted, the inquiry to which the inquiry response has already been returned is disregarded.

Subsequently, the communication delay management means 104 of the server 10 refers to the previous inquiry response transmission time for the client terminal 20a in the communication delay information held therein. Then, the communication delay management means 104 calculates the communication delay between the server 10 and the client terminal 20a on the basis of the inquiry response transmission time, the time when the inquiry is received in step S2, and the elapsed time added to the inquiry. Further, the communication delay management means 104 updates the value of the communication delay corresponding to the client terminal 20a in the communication delay information thus held with the value of the communication delay newly calculated (step S3).

After step S3, the control information management means 107 of the server 10 checks whether the playback control command transmitted to the client terminal 20a of the source of transmission of the inquiry is stored or not (step S4). In the example as illustrated in FIGS. 8 and 9, it is considered that a playback control command which is to be transmitted to the source of transmission of inquiry does not exist (i.e., the control information management means 107 does not store it). The processing in such case where there is playback control command will be explained later with reference to FIGS. 11, 13, and 14.

When there is no playback control command which is to be transmitted to the source of transmission of the inquiry, the response control means 111 causes the inquiry response transmission means 103 to wait without transmitting the inquiry response in reply to the inquiry, for a certain period of time from the inquiry reception time in step S2 (step S5).

The inquiry transmission means 201 of the client terminal 20b transmits, to the server 10, an inquiry for determining presence/absence of playback control command which is to be transmitted from the server 10 to the client terminal 20b (step S6).

The inquiry reception means 102 of the server 10 receives the inquiry transmitted by the client terminal 20b (step S7). In step S7, the response control means 111 of the server 10 stores the client terminal 20b as the client terminal to which the inquiry response in reply to the received inquiry has not yet been transmitted from the server 10.

Subsequently, the communication delay management means 104 of the server 10 refers to the previous inquiry response transmission time for the client terminal 20b in the communication delay information held therein. Then, the communication delay management means 104 calculates the communication delay between the server 10 and the client terminal 20b on the basis of the inquiry response transmission time, the time when the inquiry is received in step S7, and the elapsed time added to the inquiry. Further, the communication delay management means 104 updates the value of the communication delay corresponding to the client terminal 20b in the communication delay information thus held with the value of the communication delay newly calculated (step S8).

After step S8, the control information management means 107 of the server 10 checks whether the playback control command transmitted to the client terminal 20b of the source of transmission of the inquiry is stored or not (step S9).

There is no playback control command which is to be transmitted to the source of transmission of the inquiry, and therefore, the response control means 111 causes the inquiry response transmission means 103 to wait without transmitting the inquiry response in reply to the inquiry, for a certain period of time from the inquiry reception time in step S7 (step S10).

The operation in steps S6 to S10 is the same as the operation in steps S1 to S5 explained above. However, the standby state that is set in step S10 is cancelled before the certain period of time elapses from the reception time from the inquiry (see step S11 explained subsequently). Subsequent operation will be explained with reference to FIG. 9.

When the certain period of time passes since the reception time of the first inquiry (inquiry from the client terminal 20a) passes, the response control means 111 cancels the waiting state of the transmission of the inquiry response in reply to the inquiry. At this occasion, the response control means 111 cancels the waiting state of the transmission of all the inquiry responses kept waiting (step S11). Therefore, the waiting state of the transmission of the inquiry response in reply to the inquiry received from the client terminal 20b is cancelled before the certain period of time passes from the inquiry reception time.

As a result of step S11, the inquiry response transmission means 103 transmits all the inquiry responses that have not yet been transmitted (step S12). More specifically, the inquiry response transmission means 103 transmits the inquiry response to each of the client terminals 20a, 20b of the source of transmission of the inquiry. At this occasion, a playback control command transmitted to each of the client terminals 20a, 20b does not exist, and therefore, the playback control information is not added to the inquiry response. At this occasion, the communication delay management means 104 updates "previous inquiry response transmission time" corresponding to the client terminal 20a at the inquiry response transmission time. Likewise, the communication delay management means 104 refers to the "previous inquiry response transmission time" corresponding to the client terminal 20b.

In step S12, the response control means 111 deletes the information about the client terminals 20a, 20b stored as the client terminals to which the inquiry response has not yet been transmitted from the server 10.

In the client terminal 20a, the inquiry response reception means 202 receives the inquiry response transmitted by the server 10 in step S12 (step S13). Then, the inquiry control means 203 of the client terminal 20a causes the inquiry transmission means 201 to transmit the inquiry again. The inquiry transmission means 201 transmits the inquiry in accordance with the inquiry control means 203 (step S14). The inquiry transmission means 201 adds the elapsed time from the reception time of the inquiry response in step S13 to the inquiry transmission.

Like the client terminal 20a, in the client terminal 20b, the inquiry response reception means 202 also receives the inquiry response transmitted by the server 10 in step S12 (step S15). Then, the inquiry control means 203 of the client terminal 20b causes the inquiry transmission means 201 to transmit the inquiry again (step S16). The operation in steps S15, S16 is the same as steps S13, S14.

The operation in steps S14, S16 is the same as step S1, and the operation thereafter is the same as the operation already explained.

Figure 10:
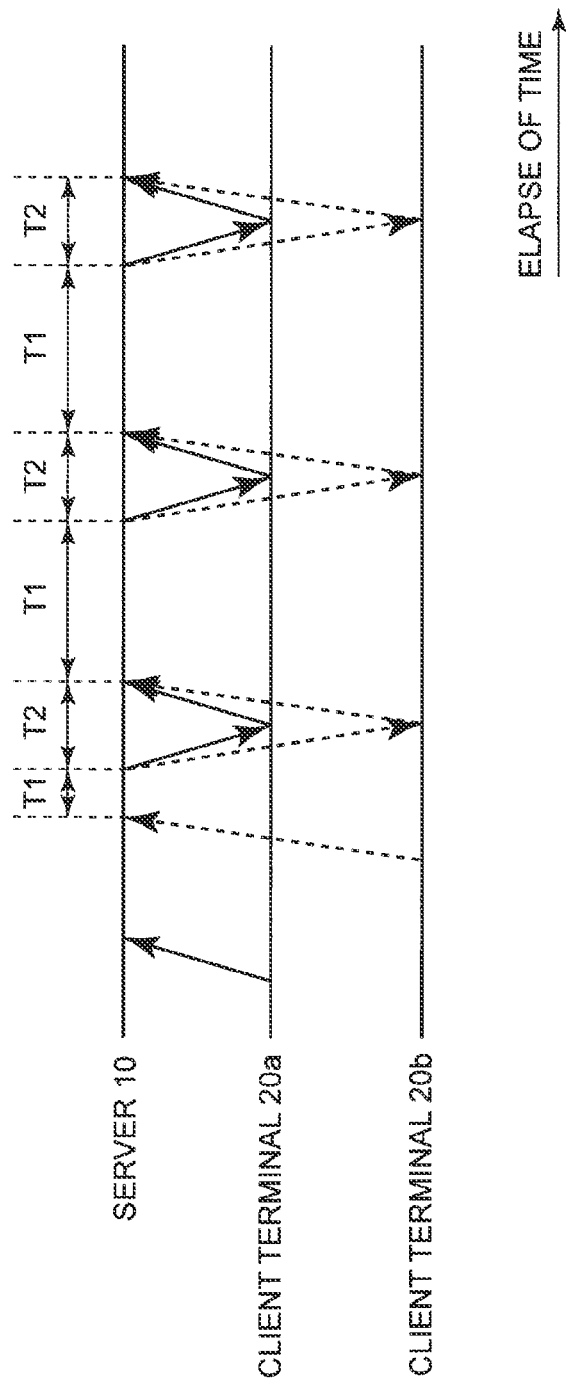
FIG. 10 It depicts a schematic diagram illustrating an example of transmission/reception timing of inquiry and inquiry response of the present invention.

FIG. 10 is a schematic diagram illustrating an example of transmission/reception timing of inquiry and inquiry response of the present invention. In FIG. 10, the horizontal axis denotes an elapse of time. The arrow from each client to the server denotes the transmission/reception of the inquiry, and the arrow from the server to each client denotes the transmission/reception of the inquiry response. It should be noted that transmission/reception between the client terminal 20a and the server 10 is denoted with an arrow of a solid line, and transmission/reception between the client 20b and the server 10 is denoted with an arrow of a broken line. In the present invention, as shown in step S12 (see FIG. 9), the inquiry response transmission means 103 transmits the inquiry response to each of the client terminals 20a, 20b of the source of transmission of the inquiry at the same time. Therefore, as illustrated in FIG. 10, first, even if the server 10 receives the inquiry from each client terminal at a different point in time, the time when the inquiry is received from each client terminal can be substantially at the same time. As a result, the period from when the server transmits the inquiry response to when the server receives a subsequent inquiry can be substantially the same for each client terminal. More specifically, the period in which the playback control information cannot be transmitted to the client terminal can be substantially the same for each client terminal. Therefore, this can prevent reduction of the period in which the server 10 can transmit the playback control information to all the client terminals 20a, 20b at the same time. The reception time of the inquiry from each client terminal may not be necessarily be completely the same due to, e.g., the difference in the communication delay for each client terminal and variation of the communication delay.

In FIG. 10, the period in which the playback control information can be transmitted to all the client terminals at the same time is represented by reference numeral T1. The period in which the playback control information cannot be transmitted to any one of the client terminals is represented by reference numeral T2.

In this example, in order for the server to receive the inquiry from each client terminal substantially at the same time, the server transmits the inquiry to all the client terminals at the same time. However, the server may transmit the inquiry in accordance with other methods. For example, on the basis of the communication delay of each client terminal, the server calculates, for each client terminal, the inquiry response transmission time at which the inquiry reception times from all the client terminals are at the same time, and transmits the inquiry response at that time, so that the server receives the inquiry from each client terminal substantially at the same time.

Subsequently, the operation in a case where the server 10 transmits an inquiry response including playback control information in reply to the inquiry from the client terminal will be explained. Hereinafter, explanation will be made in each of the case where the server 10 receives the playback control request within the period T1 in which the playback control information can be transmitted to all the client terminals at the same time (see FIG. 10) and the case where the server 10 receives the playback control request within the period T2 in which the playback control information cannot be transmitted to any one of the client terminals (see FIG. 10). In the explanation below, for example, the user of the client terminal 20a performs operation such as start of playback and stop of pause of the content, and the client terminal 20a transmits the playback control request. However, the case where the client terminal 20b transmits the playback control request is also the same.

Figure 11:
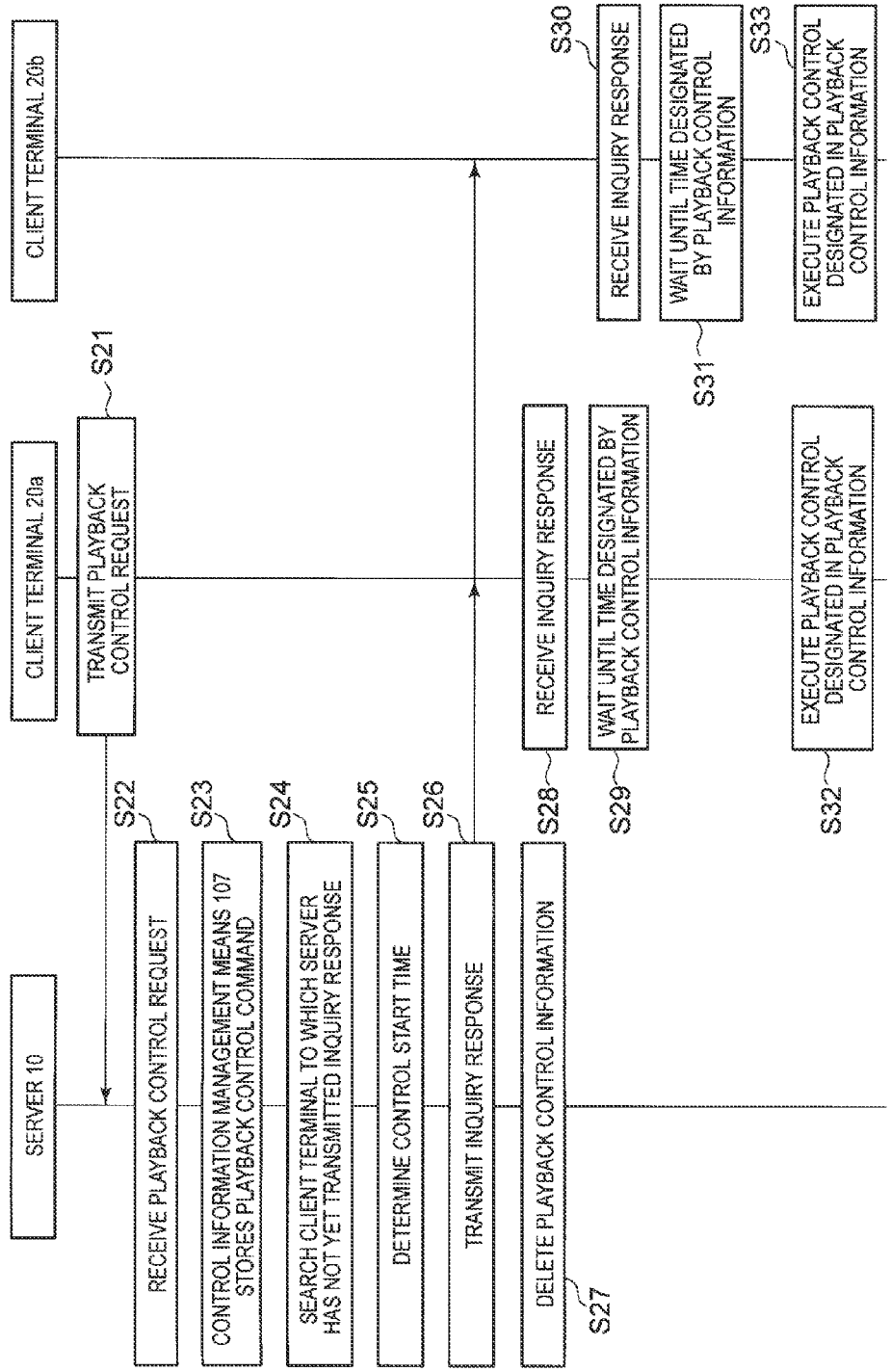
FIG. 11 It depicts a sequence diagram illustrating operation in a case where the server 10 receives playback control request within the period T1 as shown in FIG. 10.

FIG. 11 is a sequence diagram illustrating operation in a case where the server 10 receives playback control request within the period T1. In the period T1, the server 10 has already received the inquiries from all the client terminals 20a, 20b which are the targets for synchronizing the content control but has not yet transmitted the inquiry responses. The response control means 111 of the server 10 stores the client terminals 20a, 20b as the client terminal to which the server 10 has not yet transmitted the inquiry response.

First, the user of the client terminal 20a performs operation of playback control of the content. In this example, suppose that the user performs pause operation during playback of a motion picture. When the user performs playback control with the client terminal 20a, the control request transmission means 204 of the client terminal 20a transmits playback control request to the server 10 (step S21). In this case, for example, a playback control command as shown in example 1 of FIG. 4 (command for commanding start of pause) is transmitted as a playback control request.

The control request reception means 105 of the server 10 receives playback control request transmitted in step S21 (step S22). Then, the control information management means 107 of the server 10 stores the playback control command (In this example, command shown in example 1 of FIG. 4) receives as the playback control request (step S23). More specifically, the control information management means 107 stores information as shown in FIG. 6, for example. The information stored by the control information management means 107 (see FIG. 6) indicates that the playback control command (command=pause) has not yet been transmitted as the playback control information to the client terminals 20a, 20b.

The stored by the control information management means 107 is a playback control command transmitted from the server 10 to each client terminal.

When the control information management means 107 stores the playback control command, the response control means 111 searches a client terminal to which the server 10 has not transmitted the inquiry response. Then, the response control means 111 determines whether all the client terminals 20a, 20b which are the targets for synchronizing the content control have been obtained as the search result or not (step S24). In this example, all the client terminals 20a, 20b which are the targets for synchronizing the content control are determined to have been obtained as the search result. It should be noted that the response control means 111 stores information about all the client terminals which are the targets for synchronizing the content control.

In this case, the control time determination means 106 determines the control start time of the playback control command stored in step S23 (step S25). The control time determination means 106 may determine the control start time according to the method shown below for example. The control time determination means 106 obtains the current time. The control time determination means 106 refers to the communication delay information stored in the delay information management means 104 (information shown in FIG. 3, for example), and reads the communication delay of each of the client terminals 20a, 20b which is the target for synchronizing the content control. Hereinafter, the communication delay will be denoted as Rn. A subscript n of Rn is a subscript for distinguishing the communication delay of each client terminal. The current time will be denoted as t. The playback control processing time in each client terminal is $\alpha$.

The playback control processing time α is a margin time required before the playback control means 207 starts the content control according to the playback control command. The control time determination means 106 performs calculation of expression (2) below, thus determining the control start time.

$$P = t + \max(Rn/2 + \alpha) \qquad \text{expression (2)}$$

P at the left hand side of the expression (2) represents the control start time. max ( ) at the right hand side of the expression (2) means the maximum value of the value in parentheses calculated for each n (in other words, for each client terminal). More specifically, the control time determination means 106 calculates (Rn/2)+α for each client, and by adding the maximum value to the current time t, control time determination means 106 determines the control start time.

Rn/2 is one-way communication time from the server 10 to the client terminal. Therefore, the content control can be started as long as the time is max (Rn/2+α) after the current time t even with a client terminal with which a summation of α and the one-way communication time with the server is the maximum. More specifically, the time P is the earliest time at which all the client terminals can start the content control.

The value representing the one-way communication time between the server 10 and the client terminal may be a value other than the value of Rn/2. Depending on the communication method, the one-way communication time between the server 10 and the client terminal may be represented as Rn/k using a value k which is not two. The value k is a value according to the communication method. Therefore, depending on the communication method, using the value k according to the communication method, Rn/2 in the expression (2) may be replaced with Rn/k.

The playback control processing time α may be determined by the administrator of the server 10 to be stored to the control time determination means 106. In the expression (2), the playback control processing time of each of the client terminals 20a, 20b is the same value α. Alternatively, a different value may be defined as the playback control processing time for each client terminal.

The control time determination means 106 may use, as the current time t, a time close to execution of step S25. For example, the time when step S24 is finished and step S25 is started may be used as the current time t.

When the control time determination means 106 calculates the control start time, the control time determination means 106 generates the playback control information by combining the information about the control start time and the playback control command stored in step S23. Then, the control information management means 107 updates the information stored in step S23. More specifically, the playback control command stored in step S23 is updated with the content of the playback control information generated by the control time determination means 106. As a result, the control information management means 107 changes from the state of storing the playback control command without storing the control start time to the state of storing the control start time and the playback control command. FIG. 12 is an explanatory diagram illustrating an example of playback control information stored by control time determination means 106. When compared with the information that has not yet been updated as shown in FIG. 6, the information updated as shown in FIG. 12 is such that the control start time has been added, and the playback control command is stored as the playback control information.

After step S25 explained above, the response control means 111 cancels the waiting state of transmission of all the inquiry responses kept waiting, and causes the inquiry response transmission means 103 to transmit all the inquiry responses that have not yet been transmitted. Therefore, in this example, each inquiry response is transmitted before a certain period of time passes since the inquiry reception time. The inquiry response transmission means 103 transmits the inquiry response to each of the client terminals 20a, 20b in accordance with the response control means 111 (step S26). At this occasion, the control information management means 107 stores, as the playback control information, the playback control command which is to be transmitted to each of the client terminals 20a, 20b. Therefore, the inquiry response transmission means 103 transmits each inquiry response upon adding the playback control information to the inquiry response for each client terminal.

In step S26, the communication delay management means 104 updates "previous inquiry response transmission time" corresponding to the client terminal 20a at the inquiry response transmission time. Likewise, the communication delay management means 104 refers to the "previous inquiry response transmission time" corresponding to the client terminal 20b.

In step S26, the response control means 111 deletes the information about the client terminals 20a, 20b stored as the client terminals to which the inquiry response has not yet been transmitted from the server 10.

After step S26, the control information management means 107 deletes the stored playback control information (step S27).

In the client terminal 20a, the inquiry response reception means 202 receives the inquiry response transmitted by the server 10 in step S26 (step S28). Then, the playback control means 207 of the client terminal 20a waits without performing the content playback control until the control start time indicated by the playback control information included in the inquiry response (step S29).

Likewise, in the client terminal 20b, the inquiry response reception means 202 also receives the inquiry response transmitted by the server 10 in step S26 (step S30). Then, the playback control means 207 of the client terminal 20b waits without performing the content playback control until the control start time indicated by the playback control information included in the inquiry response (step S31).

The control start times included in the playback control information received by the client terminals 20a, 20b are the same time. The playback control means 207 of each of the client terminals 20a, 20b executes, at the control start time, the content control indicated by the playback control command in the playback control information (steps S32, S33). The playback means 205 of each of the client terminals 20a, 20b performs operation according to the control of the playback control means 207. In this example, processing for pausing the motion picture which is being played is performed. As a result, the motion picture played by the client terminals 20a, 20b is paused in a synchronized manner. In this case, pause is explained as an example, but the processing is the same also in the case of playback start, fast-forward, fast-reverse, cue playback, and the like.

Although not shown in FIG. 11, each of the client terminals 20a, 20b transmits the inquiry to the server 10 again after the inquiry response is received. This operation is the same as the operation already explained, and the detailed explanation thereabout is omitted.

Figure 13:
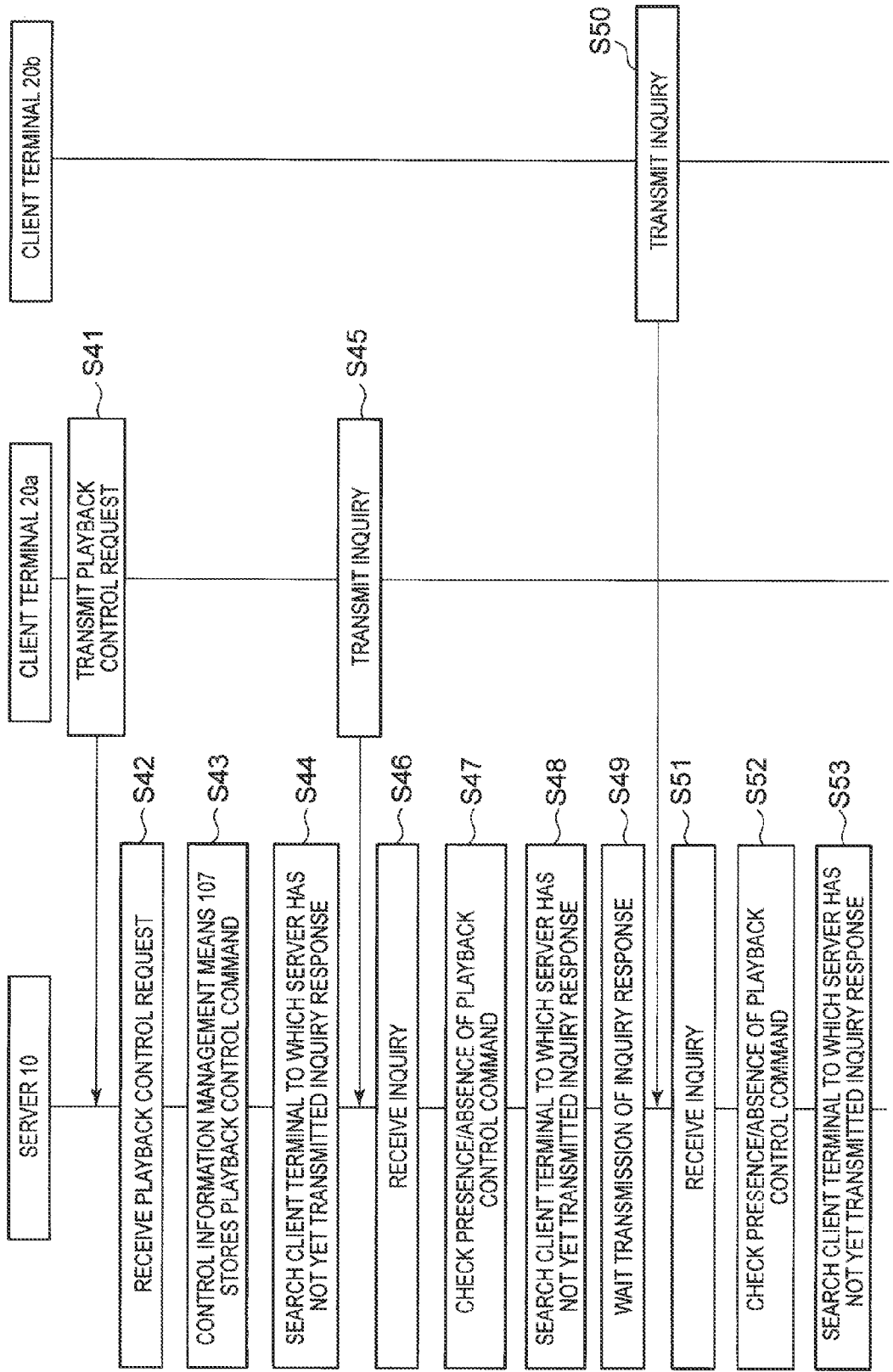
FIG. 13 It depicts a sequence diagram illustrating operation in a case where the server 10 receives playback control request within the period T2 as shown in FIG. 10.
Figure 14:
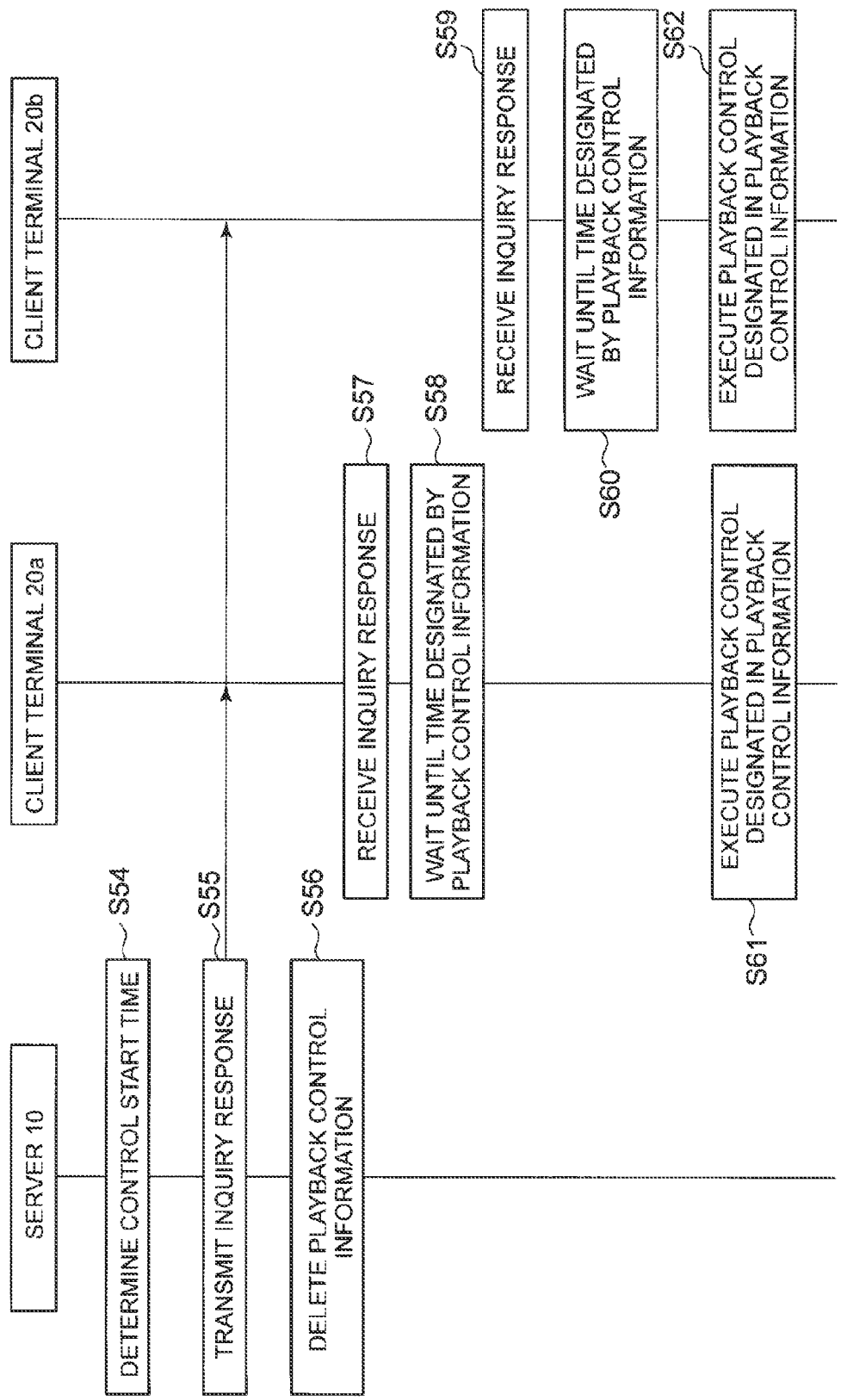
FIG. 14 It depicts a sequence diagram illustrating operation in a case where the server 10 receives playback control request within the period T2 as shown in FIG. 10.

FIGS. 13 and 14 are sequence diagrams illustrating operation in a case where the server 10 receives playback control request within the period T2 as shown in FIG. 10. Being the period T2 means that the server 10 has not received the inquiries from some or all of the client terminals.

First, the client terminal 20a transmits, as the playback control request, the playback control command according to the playback control operation of a content by a user (step S41).

The control request reception means 105 of the server 10 receives playback control request transmitted in step S41 (step S42). Then, the control information management means 107 of the server 10 stores the playback control command received as the playback control request (step S43).

As already explained, when the control information management means 107 stores the playback control command, the response control means 111 searches a client terminal to which the server 10 has not transmitted the inquiry response. Then, the response control means 111 determines whether all the client terminals 20a, 20b which are the targets for synchronizing the content control have been obtained as the search result or not (step S44).

The operation in steps S41 to S44 is the same as steps S21 to S24 (see FIG. 11). However, in this example, the response control means 111 determines that all the client terminals 20a, 20b which are the targets for synchronizing the content control have not been obtained as the search result in step S44.

When some or all of the client terminals which are the targets for synchronizing the content control are not obtained as the search result, the response control means 111 waits until the inquiry is received from each client terminal.

Thereafter, the inquiry transmission means 201 of the client terminal 20a transmits, to the server 10, an inquiry for determining presence/absence of playback control command not transmitted to the client terminal 20a from the server 10 (step S45). Then, the inquiry reception means 102 of the server 10 receives the inquiry, and the response control means 111 stores the client terminal 20a as the client terminal to which the server 10 has not yet transmitted the inquiry response in reply to the inquiry received (step S46). Although not shown in FIG. 13, after steps S46, S51, the communication delay management means 104 updates the communication delay information. This operation is the same as the operation in step S3 explained above.

Thereafter, the control information management means 107 of the server 10 checks whether the playback control command transmitted to the client terminal 20a of the source of transmission of the inquiry is stored or not (step S47). In this example, the control information management means 107 stores the playback control command.

When the control information management means 107 stores the playback control command when receiving the inquiry, the response control means 111 searches a client terminal to which the server 10 has not transmitted the inquiry response. Then, the response control means 111 determines whether all the client terminals 20a, 20b which are the targets for synchronizing the content control have been obtained as the search result (step S48). The operation in step S48 is the same as step S24 (see FIG. 11).

When all the client terminals which are the targets for synchronizing the content control have not been obtained as the search result of client terminals to which the inquiry response has not yet been transmitted, the response control means 111 causes the inquiry response transmission means 103 to wait without transmitting the inquiry response in reply to the inquiry for the certain period of time since the inquiry reception time (step S49). In step S48, only the "client terminal 20a" is obtained as the search result of the client terminal to which the inquiry response has not yet been transmitted, and the "client terminal 20b" is not included in the search result. Therefore, in this case, step S49 is executed.

The inquiry transmission means 201 of the client terminal 20b transmits, to the server 10, an inquiry for determining presence/absence of playback control command not transmitted to the client terminal 20b from the server (step S50). Then, the inquiry reception means 102 of the server 10 receives the inquiry, and the response control means 111 stores the client terminal 20b as the client terminal to which the server 10 has not yet transmitted the inquiry response in reply to the inquiry received (step S51). As described above, after step S51, the communication delay management means 104 updates the communication delay information, but FIG. 13 does not show this processing.

Thereafter, the control information management means 107 of the server 10 checks whether the playback control command transmitted to the client terminal 20b of the source of transmission of the inquiry is stored or not (step S52). In this example, the control information management means 107 stores the playback control command.

Accordingly, the response control means 111 searches a client terminal to which the server 10 has not transmitted the inquiry response. Then, the response control means 111 determines whether all the client terminals 20a, 20b which are the targets for synchronizing the content control have been obtained as the search result or not (step S53). The operation in steps S50 to S53 is the same as the operation in steps S45 to S48. In step S53, all the client terminals which are the targets for synchronizing the content control are obtained as the search result of the client terminals to which the inquiry response has not yet been transmitted. Subsequent operation will be explained with reference to FIG. 14.

When all the client terminals which are the targets for synchronizing the content control are obtained as the search result to which the inquiry response has not yet been transmitted, the control time determination means 106 determines the control start time of the playback control command stored in step S43 (step S54). When the control time determination means 106 calculates the control start time, the control time determination means 106 generates the playback control information by combining the information about the control start time and the playback control command stored in step S43. Then, the control information management means 107 updates the playback control command stored in step S43 with the content of the playback control information generated by the control time determination means 106.

The operation in step S54 and subsequent steps is the same as the operation in step S25 and subsequent steps (see FIG. 11). More specifically, after step S54 explained above, the response control means 111 cancels the waiting state of transmission of all the inquiry responses kept waiting, and causes the inquiry response transmission means 103 to transmit all the inquiry responses that have not yet been transmitted. At this occasion, the inquiry response transmission means 103 transmits each inquiry response upon adding the playback control information to the inquiry response for each client terminal. In step S55, the communication delay management means 104 updates "previous inquiry response transmission time" corresponding to the client terminal 20a at the inquiry response transmission time. Likewise, the communication delay management means 104 refers to the "previous inquiry response transmission time" corresponding to the client terminal 20b. The response control means 111 deletes the information about the client terminals 20a, 20b stored as the client terminals to which the inquiry response has not yet been transmitted from the server 10.

After step S55, the control information management means 107 deletes the stored playback control information (step S56).

In the client terminal 20a, the inquiry response reception means 202 receives the inquiry response transmitted by the server 10 in step S55 (step S57). Then, the playback control means 207 of the client terminal 20a waits without performing the content playback control until the control start time indicated by the playback control information included in the inquiry response (step S58).

Likewise, in the client terminal 20b, the inquiry response reception means 202 also receives the inquiry response transmitted by the server 10 in step S26 (step S59). Then, the playback control means 207 of the client terminal 20b waits without performing the content playback control until the control start time indicated by the playback control information included in the inquiry response (step S60).

The playback control means 207 of each of the client terminals 20a, 20b executes, at the control start time included in the received playback control information, the content control indicated by the playback control command in the playback control information (steps S61, S62). The playback means 205 of each of the client terminals 20a, 20b performs operation according to the control of the playback control means 207.

Although not shown in FIG. 14, each of the client terminals 20a, 20b transmits the inquiry to the server 10 again after the inquiry response is received. This operation is the same as the operation already explained, and the detailed explanation thereabout is omitted.

According to the present exemplary embodiment, when the server 10 receives a playback control request (playback control command) from any one of the client terminals, the server transmits all the inquiry responses to the client terminals 20a, 20b when the following condition is satisfied: the transmission of all the inquiry responses to the client terminals 20a, 20b is kept waiting. At this occasion, the server 10 calculates max (Rn/2+α), and determines the control start time of the playback control command on the basis of the value thereof. Then, the server 10 adds the playback control information including the playback control command and the control start time to the inquiry response for each client terminal. Therefore, the long polling is employed under HTTP, and the server 10 can synchronize the content control in each of the client terminals 20a, 20b.

In the present exemplary embodiment, the server 10 transmits the inquiry response to each of the client terminals 20a, 20b at the same time. As a result, this can prevent decrease of the period in which the server 10 can transmit the playback control information to all the client terminals 20a, 20b at the same time.

In the mode for transmitting commands concerning video data in a peer-to-peer manner between user computers in the techniques described in PLT 3, it is difficult to directly transmit a command to a user computer under NAT (network address translation) or in the firewall. However, this problem can be solved by installing dedicated application software supporting TCP (transmission control protocol) to the user computer. However, the dedicated application software is required. In contrast, in the present invention, communication is performed in accordance with HTTP, and therefore, the client terminal under NAT and the like can be controlled by the server 10. Moreover, it is not necessary to use dedicated application software supporting TCP, and contents can be played using a generally-available browser.

Figure 15:
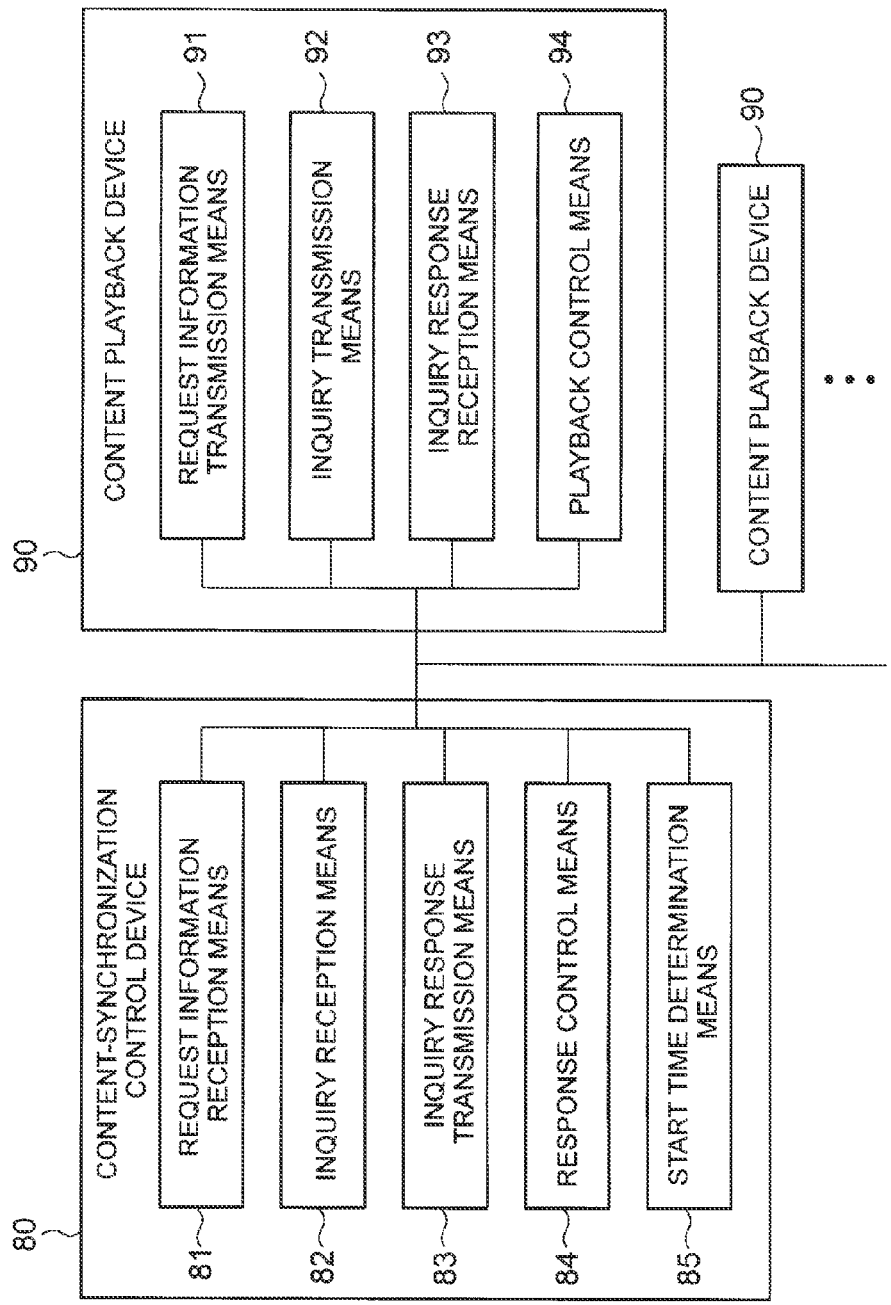
FIG. 15 It depicts a block diagram illustrating a minimum configuration of a content synchronization system of the present invention.
Figure 16:
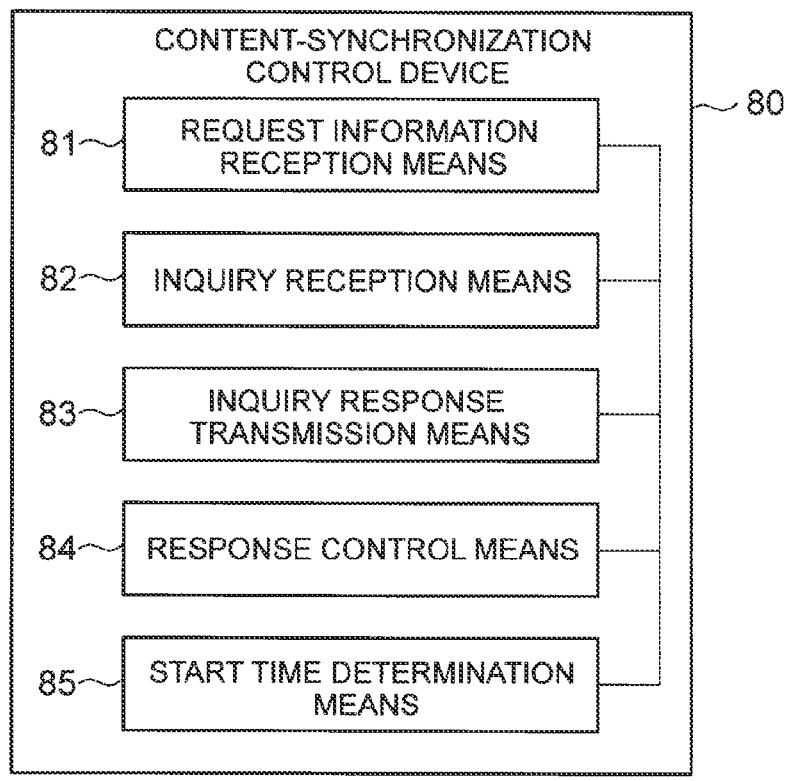
FIG. 16 It depicts a block diagram illustrating a minimum configuration of a content-synchronization control device of the present invention.
Figure 17:
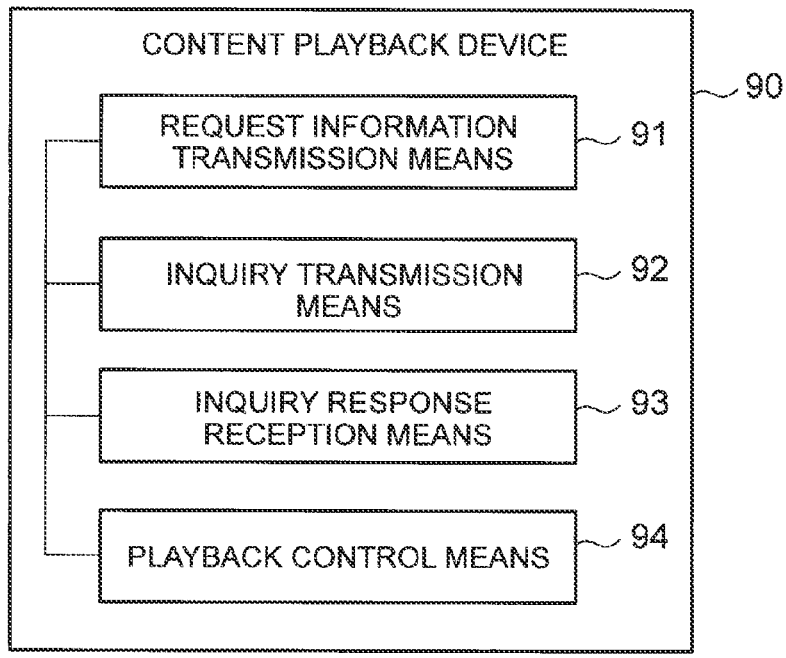
FIG. 17 It depicts a block diagram illustrating a minimum configuration of a content playback device of the present invention.
Figure 18:
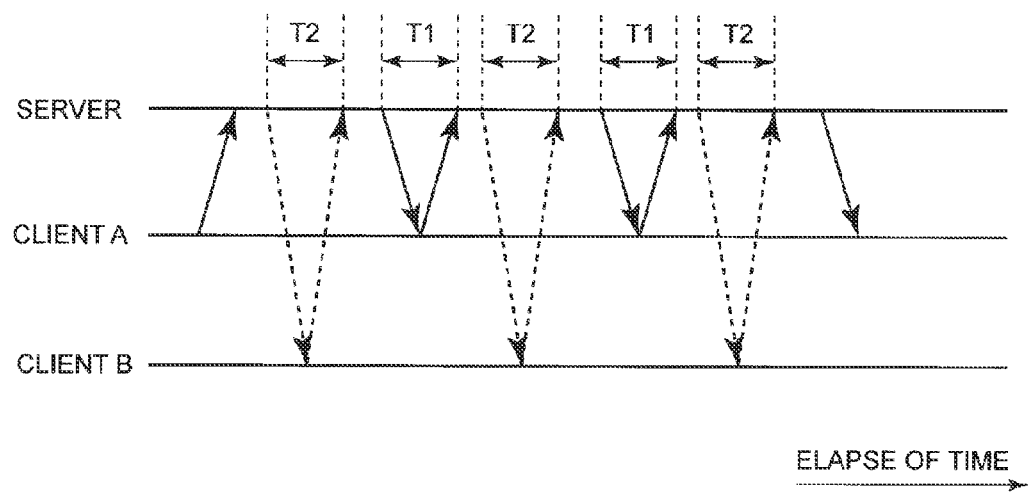
FIG. 18 It depicts a schematic diagram illustrating a period in which the server cannot transmit information to the client of the source of transmission of the inquiry when the long polling is employed.

Subsequently, the minimum configuration of the present invention will be explained. FIG. 15 is a block diagram illustrating a minimum configuration of a content synchronization system of the present invention. FIG. 16 is a block diagram illustrating a minimum configuration of a content-synchronization control device of the present invention. FIG. 17 is a block diagram illustrating a minimum configuration of a content playback device of the present invention. In FIGS. 16 and 17, the same elements as those of the elements indicated in FIG. 15 are denoted with the same reference numerals as those of FIG. 15.

The content synchronization system of the present invention includes multiple content playback devices for playing contents and a content-synchronization control device 80 for synchronizing content control in the multiple content playback devices 90.

The content-synchronization control device 80 includes request information reception means 81, inquiry reception means 82, inquiry response transmission means 83, response control means 84, and start time determination means 85 (see FIGS. 15 and 16).

The request information reception means 81 (for example, control request reception means 105) receives, from each content playback device, request information (for example, playback control request) for requesting each content playback device to execute a playback control command which is a command concerning playback control of contents in a synchronized manner.

The inquiry reception means 82 (for example, inquiry reception means 101) receives the inquiry for determining presence/absence of playback control command transmitted from each content playback device to the content playback device.

The inquiry response transmission means 83 (for example, inquiry response transmission means 103) transmits, to the content playback device of the source of transmission of the inquiry, the inquiry response which is the response in reply to the inquiry.

For a certain period of time since reception of the inquiry, the response control means 84 (for example, response control means 111) causes the inquiry response transmission means 83 to wait transmission of the inquiry response in reply to the inquiry, and when a certain period of time passes since reception of an inquiry and the waiting state of the transmission of the inquiry response in reply to the inquiry is to be cancelled, the waiting state of the transmission of all the inquiry responses is cancelled.

The start time determination means 85 (for example, control time determination means 106) determines the start time when each content playback device 90 starts the content control in accordance with the playback control command indicated by the request information received by the request information reception means 81.

Then, when the request information reception means 81 receives the request information, the response control means 84 cancels the waiting state of the transmission of each inquiry response when the following condition is satisfied: the transmission of each inquiry response to each content playback device 90 is kept waiting. When the condition is satisfied and the waiting state of the transmission of each inquiry response to each content playback device 90 is cancelled, the inquiry response transmission means 83 transmits the inquiry response including the playback control information including the information about the start time determined with regard to the playback control command and the playback control command indicated by the request information.

The content playback device 90 includes request information transmission means 91, inquiry transmission means 92, inquiry response reception means 93, and playback control means 94 (see FIGS. 13 and 15).

The request information transmission means 91 (for example, control request transmission means 204) transmits the request information to the content-synchronization control device 80.

The inquiry transmission means 92 (for example, inquiry transmission means 201) transmits the inquiry to the content-synchronization control device.

The inquiry response reception means 93 (For example, inquiry response reception means 202) receives the inquiry response transmitted by the inquiry response transmission means 83 in response to the inquiry.

When the inquiry response includes the playback control information, the playback control means 94 (for example, playback control means 207) starts content control according to the playback control command indicated by the playback control information, at the start time indicated by the playback control information.

The inquiry transmission means 92 transmits the inquiry again when the inquiry response reception means 93 receives the inquiry response.

According to the above configuration, when long polling is employed under HTTP, a content-synchronization control device can control each content playback device so that content control is synchronized in multiple content playback devices.

A part or all of the exemplary embodiments explained above can also be described as shown in the following Supplementary note, but it is not limited thereto.

(Supplementary Note 1) A content synchronization system including a plurality of content playback devices configured to play a content, and a content-synchronization control device for synchronizing content control with the plurality of content playback devices, wherein the content-synchronization control device includes a request information reception unit configured to receive, from each content playback device, request information for requesting each content playback device to execute a playback control command which is a command concerning playback control of the content in a synchronized manner, an inquiry reception unit configured to receive an inquiry for determining presence/absence of playback control command transmitted to the content playback device from each content playback device, an inquiry response transmission unit configured to transmit an inquiry response which is a response in reply to the inquiry to the content playback device of the source of transmission of the inquiry, a response control unit configured to cause the inquiry response transmission unit to wait transmission of the inquiry response in reply to the inquiry for a certain period of time since reception of the inquiry, and when a certain period of time passes since reception of the inquiry and the waiting state of the transmission of the inquiry response in reply to the inquiry is to be cancelled, the waiting state of the transmission of all the inquiry responses is cancelled, and a start time determination unit configured to determine a start time when each content playback device starts the content control in accordance with the playback control command indicated by the request information received by the request information reception unit, wherein when the request information reception unit receives the request information, the response control unit cancels the waiting state of the transmission of each inquiry response when the following condition is satisfied: the transmission of each inquiry response to each content playback device is kept waiting, and when the condition is satisfied and the waiting state of the transmission of each inquiry response to each content playback device is cancelled, the inquiry response transmission unit transmits the inquiry response including the playback control information including the information about the start time determined with regard to the playback control command and the playback control command indicated by the request information, and each content playback device includes a request information transmission unit configured to transmit the request information to the content-synchronization control device, an inquiry transmission unit configured to transmit the inquiry to the content-synchronization control device, an inquiry response reception unit configured to receive the inquiry response transmitted by the inquiry response transmission unit in reply to the inquiry, and a playback control unit, wherein when the inquiry response includes playback control information, the playback control unit starts the content control in accordance with the playback control command indicated by the playback control information, at the start time indicated by the playback control information, wherein the inquiry transmission unit transmits the inquiry again when the inquiry response reception unit receives the inquiry response.

(Supplementary Note 2) The content synchronization system according to Supplementary note 1, wherein the content-synchronization control device includes communication delay calculation unit configured to calculate communication delay which is two-way communication time between the content-synchronization control device and the content playback device of the source of transmission of the inquiry when the inquiry reception unit receives the inquiry, and the start time determination unit determines a start time when each content playback device starts the content control on the basis of the communication delay of each content playback device.

(Supplementary Note 3) The content synchronization system according to Supplementary note 2, wherein, for each content playback device, the start time determination unit calculates, on the basis of the communication delay, one-way communication time between the content-synchronization control device and the content playback device, calculates a time obtained by adding the one-way communication time to a predetermined time, and adds the maximum value of the calculation result to a current time, thus determining the start time when each content playback device starts the content control.

(Supplementary Note 4) The content synchronization system according to Supplementary note 2 or 3, wherein the inquiry transmission unit of each content playback device incorporates, into the inquiry, an elapsed time from when the inquiry response is received to when the inquiry is transmitted, and transmits the inquiry, and the communication delay calculation unit of the content-synchronization control device calculates the communication delay concerning the content playback device of the source of transmission of inquiry by subtracting the elapsed time from the transmission interval of the inquiry response.

(Supplementary Note 5) A content-synchronization control device for synchronizing content control with a plurality of content playback devices, including a request information reception unit configured to receive, from each content playback device, request information for requesting each content playback device to execute a playback control command which is a command concerning playback control of the content in a synchronized manner, an inquiry reception unit configured to receive an inquiry for determining presence/absence of playback control command transmitted to the content playback device from each content playback device, an inquiry response transmission unit configured to transmit an inquiry response which is a response in reply to the inquiry to the content playback device of the source of transmission of the inquiry, a response control unit configured to cause the inquiry response transmission unit to wait transmission of the inquiry response in reply to the inquiry for a certain period of time since reception of the inquiry, and when a certain period of time passes since reception of the inquiry and the waiting state of the transmission of the inquiry response in reply to the inquiry is to be cancelled, the waiting state of the transmission of all the inquiry responses is cancelled, and a start time determination unit configured to determine a start time when each content playback device starts the content control in accordance with the playback control command indicated by the request information received by the request information reception unit, wherein when the request information reception unit receives the request information, the response control unit cancels the waiting state of the transmission of each inquiry response when the following condition is satisfied: the transmission of each inquiry response to each content playback device is kept waiting, and when the condition is satisfied and the waiting state of the transmission of each inquiry response to each content playback device is cancelled, the inquiry response transmission unit transmits the inquiry response including the playback control information including the information about the start time determined with regard to the playback control command and the playback control command indicated by the request information.

(Supplementary Note 6) The content synchronization system according to Supplementary note 5, wherein the content-synchronization control device includes communication delay calculation unit configured to calculate communication delay which is two-way communication time between the content-synchronization control device and the content playback device of the source of transmission of the inquiry when the inquiry reception unit receives the inquiry, and the start time determination unit determines a start time when each content playback device starts the content control on the basis of the communication delay of each content playback device.

(Supplementary Note 7) A content playback device for playing a content, including a request information transmission unit configured to transmit the request information for requesting each content playback device to execute a playback control command which is a command concerning playback control of the content in a synchronized manner to the content-synchronization control device for synchronizing content control with a plurality of content playback devices, an inquiry transmission unit configured to transmit the inquiry for determining presence/absence of the playback control command which is to be transmitted to the content playback device to the content-synchronization control device, an inquiry response reception unit configured to receive the inquiry response transmitted by the content-synchronization control device in reply to the inquiry, and a playback control unit, wherein when the inquiry response includes the playback control command and the information about the start time of the content control according to the playback control command, the playback control unit starts the content control in accordance with the playback control command at the start time, wherein the inquiry transmission unit transmits the inquiry again when the inquiry response reception unit receives the inquiry response.

(Supplementary Note 8) The content playback device according to Supplementary note 7, wherein the inquiry transmission unit incorporates, into the inquiry, information about an elapsed time from when the inquiry response is received to when the inquiry is transmitted, and transmits the inquiry to the content-synchronization control device.

This application claims priority based on Japanese Patent Application No. 2011-208494 filed on Sep. 26, 2011, and all the disclosure therein is incorporated herein by reference.

As described above, the invention of the present application has been explained with reference to the exemplary embodiments, but the invention of the present application is not limited to the above exemplary embodiments. The configuration and the details of the invention of the present application can be changed in various manners that can be understood by a person skilled in the art within the scope of the invention of the present application.

INDUSTRIAL APPLICABILITY

The present invention can be preferably applied to the purpose of synchronizing the content control in multiple content playback devices.

REFERENCE SIGNS LIST 10, 11 Server (Content-synchronization control device)
20, 20a, 20b Client terminal (Content playback device)
101 Inquiry reception means
103 Inquiry response transmission means
104 Communication delay management means
105 Control request reception means
106 Control time determination means
107 Control information management means
108 Time synchronization means
109 Data memory means
110 Data transmission means
111 Response control means
201 Inquiry transmission means
202 Inquiry response reception means
203 Inquiry control means
204 Control request transmission means
205 Playback means
206 Time synchronization means
207 Playback control means
208 Data reception means
209 Data accumulation means

The invention claimed is:

1. A content synchronization system comprising:
a plurality of content playback devices configured to play a content;
and a content-synchronization control device for synchronizing content control with the plurality of content playback devices,
wherein the content-synchronization control device comprises:
a request information reception unit implemented at least by hardware including a processor configured to receive, from each content playback device, request information for requesting each content playback device to execute a playback control command which is a command concerning playback control of the content in a synchronized manner;
an inquiry reception unit implemented at least by hardware including a processor configured to receive an inquiry for determining presence/absence of playback control command transmitted to the content playback device from each content playback device;
an inquiry response transmission unit implemented at least by hardware including a processor configured to transmit an inquiry response which is a response in reply to the inquiry to the content playback device of the source of transmission of the inquiry;

a response control unit implemented at least by hardware including a processor configured to cause the inquiry response transmission unit to wait transmission of the inquiry response in reply to the inquiry for a certain period of time since reception of the inquiry, and when a certain period of time passes since reception of the inquiry and the waiting state of the transmission of the inquiry response in reply to the inquiry is to be cancelled, the waiting state of the transmission of all the inquiry responses is cancelled; and a start time determination unit implemented at least by hardware including a processor configured to determine a start time when each content playback device starts the content control in accordance with the playback control command indicated by the request information received by the request information reception unit, wherein when the request information reception unit receives the request information, the response control unit cancels the waiting state of the transmission of each inquiry response when the following condition is satisfied: the transmission of each inquiry response to each content playback device is kept waiting, and when the condition is satisfied and the waiting state of the transmission of each inquiry response to each content playback device is cancelled, the inquiry response transmission unit transmits the inquiry response including the playback control information including the information about the start time determined with regard to the playback control command and the playback control command indicated by the request information, each content playback device comprises:

a request information transmission unit implemented at least by hardware including a processor configured to transmit the request information to the content-synchronization control device;

an inquiry transmission unit implemented at least by hardware including a processor configured to transmit the inquiry to the content-synchronization control device;

an inquiry response reception unit implemented at least by hardware including a processor configured to receive the inquiry response transmitted by the inquiry response transmission unit in reply to the inquiry; and a playback control unit implemented at least by hardware including a processor, wherein when the inquiry response includes playback control information, the playback control unit starts the content control in accordance with the playback control command indicated by the playback control information, at the start time indicated by the playback control information, wherein the inquiry transmission unit transmits the inquiry again when the inquiry response reception unit receives the inquiry response.

2. The content synchronization system according to claim 1, wherein the content-synchronization control device comprises a communication delay calculation unit implemented at least by hardware including a processor configured to calculate communication delay which is two-way communication time between the content-synchronization control device and the content playback device of the source of transmission of the inquiry when the inquiry reception unit receives the inquiry, and the start time determination unit determines a start time when each content playback device starts the content control on the basis of the communication delay of each content playback device.

3. The content synchronization system according to claim 2, wherein, for each content playback device, the start time determination unit calculates, on the basis of the communication delay, one-way communication time between the content-synchronization control device and the content playback device, calculates a time obtained by adding the one-way communication time to a predetermined time, and adds the maximum value of the calculation result to a current time, thus determining the start time when each content playback device starts the content control.

4. The content synchronization system according to claim 2, wherein the inquiry transmission unit of each content playback device incorporates, into the inquiry, an elapsed time from when the inquiry response is received to when the inquiry is transmitted, and transmits the inquiry, and the communication delay calculation unit of the content-synchronization control device calculates the communication delay concerning the content playback device of the source of transmission of inquiry by subtracting the elapsed time from the transmission interval of the inquiry response.

5. A content-synchronization control device for synchronizing content control with a plurality of content playback devices, comprising:

a request information reception unit implemented at least by hardware including a processor configured to receive, from each content playback device, request information for requesting each content playback device to execute a playback control command which is a command concerning playback control of the content in a synchronized manner;

an inquiry reception unit implemented at least by hardware including a processor configured to receive an inquiry for determining presence/absence of playback control command transmitted to the content playback device from each content playback device;

an inquiry response transmission unit implemented at least by hardware including a processor configured to transmit an inquiry response which is a response in reply to the inquiry to the content playback device of the source of transmission of the inquiry;

a response control unit implemented at least by hardware including a processor configured to cause the inquiry response transmission unit to wait transmission of the inquiry response in reply to the inquiry for a certain period of time since reception of the inquiry, and when a certain period of time passes since reception of the inquiry and the waiting state of the transmission of the inquiry response in reply to the inquiry is to be cancelled, the waiting state of the transmission of all the inquiry responses is cancelled; and a start time determination unit implemented at least by hardware including a processor configured to determine a start time when each content playback device starts the content control in accordance with the playback control command indicated by the request information received by the request information reception unit, wherein when the request information reception unit receives the request information, the response control unit cancels the waiting state of the transmission of each inquiry response when the following condition is satisfied: the transmission of each inquiry response to each content playback device is kept waiting, and when the condition is satisfied and the waiting state of the transmission of each inquiry response to each content playback device is cancelled, the inquiry response transmission unit transmits the inquiry response including the playback control information including the information about the start time determined with regard to the playback control command and the playback control command indicated by the request information.

6. The content-synchronization control device according to claim 5, wherein the content-synchronization control device comprises a communication delay calculation unit implemented at least by hardware including a processor configured to calculate communication delay which is two-way communication time between the content-synchronization control device and the content playback device of the source of transmission of the inquiry when the inquiry reception unit receives the inquiry, and
the start time determination unit determines a start time when each content playback device starts the content control on the basis of the communication delay of each content playback device.

7. A content synchronization method for causing each of a plurality of content playback devices playing a content to transmit, to a content-synchronization control device, an inquiry for determining presence/absence of a playback control command which is to be transmitted to the content playback device,
wherein the content-synchronization control device waits transmission of the inquiry response in reply to the inquiry for a certain period of time since reception of the inquiry, and when a certain period of time passes since reception of the inquiry and the waiting state of the transmission of the inquiry response in reply to the inquiry is to be cancelled, the waiting state of the transmission of all the inquiry responses is cancelled; and
the content-synchronization control device receives the request information, when any one of the content playback devices transmits request information for requesting each content playback device to execute a playback control command which is a command concerning playback control of the content in a synchronized manner, and when a condition that the transmission of each inquiry response to each content playback device is kept waiting is satisfied after reception of the request information, the content-synchronization control device determines a start time when each content playback device starts the content control in accordance with the playback control command indicated by the request information, and the content-synchronization control device cancels the waiting state of the transmission of each inquiry response, and transmits each inquiry response including the playback control information including the information about the start time determined with regard to the playback control command and the playback control command,
when each content playback device receives the inquiry response from the content-synchronization control device, the content playback device transmits the inquiry to the content-synchronization control device again, and
when the received inquiry response includes the playback control information, each content playback device starts the content control in accordance with the playback control command indicated by the playback control information at the start time indicated by the playback control information.

8. The content synchronization method according to claim 7, wherein the content-synchronization control device calculates communication delay which is two-way communication time between the content-synchronization control device and the content playback device of the source of transmission of the inquiry when receiving the inquiry, and
the content-synchronization control device determines, on the basis of the communication delay of each content playback device, a start time when the content-synchronization control device determines the start time when each content playback device starts the content control.

9. A content synchronization control method, wherein a content-synchronization control device receives an inquiry for determining presence/absence of a playback control command transmitted to a content playback device of the source of transmission of the inquiry, which is an inquiry transmitted from a plurality of content playback devices playing a content,
the content-synchronization control device waits transmission of the inquiry response in reply to the inquiry for a certain period of time since reception of the inquiry, and when a certain period of time passes since reception of the inquiry and the waiting state of the transmission of the inquiry response in reply to the inquiry is to be cancelled, the waiting state of the transmission of all the inquiry responses is cancelled,
when receiving from any one of the content playback devices, request information for requesting each content playback device to execute a playback control command which is a command concerning playback control of the content in a synchronized manner, the content-synchronization control device determines a start time when each content playback device starts the content control in accordance with the playback control command indicated by the request information when a condition that the transmission of each inquiry response to each content playback device is kept waiting is satisfied, and the content-synchronization control device cancels the waiting state of the transmission of each inquiry response, and transmits each inquiry response including the playback control information including the information about the start time determined with regard to the playback control command and the playback control command.

10. The content synchronization control method according to claim 9, wherein the content-synchronization control device calculates communication delay which is two-way communication time between the content-synchronization control device and the content playback device of the source of transmission of the inquiry when receiving the inquiry, and
the content-synchronization control device determines, on the basis of the communication delay of each content playback device, a start time when the content-synchronization control device determines the start time when each content playback device starts the content control.

11. A non-transitory computer-readable recording medium in which a content synchronization control program is recorded, the content synchronization control program causing a computer to execute:
response control processing in which when receiving, from each content playback device, an inquiry for determining presence/absence of a playback control command transmitted to a content playback device, transmission of the inquiry response in reply to the inquiry is kept waiting for a certain period of time since reception of the inquiry, and when a certain period of time passes since reception of the inquiry and the waiting state of the transmission of the inquiry response in reply to the inquiry is to be cancelled, the waiting state of the transmission of all the inquiry responses is cancelled;
request information reception processing for receiving, from each content playback device, request information for requesting each content playback device to execute a playback control command which is a command concerning playback control of the content in a synchronized manner; and playback control information transmission processing in which when a condition that the transmission of each inquiry response to each content playback device is kept waiting is satisfied after reception of the request information, determining a start time when each content playback device starts the content control in accordance with the playback control command indicated by the request information, and canceling the waiting state of the transmission of each inquiry response, and transmitting each inquiry response including the playback control information including the information about the start time determined with regard to the playback control command and the playback control command.

* * * * *